United States Patent
Chen

(10) Patent No.: US 12,080,895 B2
(45) Date of Patent: Sep. 3, 2024

(54) METHOD FOR THE SYNTHESIS OF HIGH EFFICIENCY PT BRANCHED NANOCATALYSTS

(71) Applicant: HONDA MOTOR CO., LTD., Tokyo (JP)

(72) Inventor: Shutang Chen, Livermore, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 4 days.

(21) Appl. No.: 17/883,912

(22) Filed: Aug. 9, 2022

(65) Prior Publication Data

US 2024/0055615 A1  Feb. 15, 2024

(51) Int. Cl.
  *B01J 23/42* (2006.01)
  *B01J 37/04* (2006.01)
  *B01J 37/08* (2006.01)
  *H01M 4/92* (2006.01)

(52) U.S. Cl.
  CPC ............................... *H01M 4/925* (2013.01)

(58) Field of Classification Search
  CPC ........... B01J 37/04; B01J 37/08; H01M 4/925
  USPC .................................................. 502/326, 339
  See application file for complete search history.

(56) References Cited

U.S. PATENT DOCUMENTS

| | | | | |
|---|---|---|---|---|
| 7,029,514 B1* | 4/2006 | Yang | ...................... | H01F 1/0054 75/348 |
| 8,110,021 B2* | 2/2012 | Zhong | ...................... | B22F 1/054 75/371 |
| 8,741,801 B2* | 6/2014 | Fang | ...................... | B01J 23/8913 977/773 |
| 10,883,183 B2* | 1/2021 | Chen | ...................... | B01J 35/002 |
| 11,311,939 B2* | 4/2022 | Chen | ...................... | B01J 23/8933 |
| 11,331,725 B2* | 5/2022 | Chen | ...................... | B01J 35/0013 |
| 11,458,461 B2* | 10/2022 | Chen | ...................... | B01J 27/04 |
| 11,458,538 B2* | 10/2022 | Chen | ...................... | B22F 1/054 |
| 11,766,660 B1* | 9/2023 | Chen | ...................... | B01J 35/026 502/339 |
| 2022/0324882 A1* | 10/2022 | Chen | ................. | G01N 27/4141 |

(Continued)

OTHER PUBLICATIONS

Chi Xiao et al., High-Index-Facet- and High-Surface-Energy Nanocrystals of Metals and Metal Oxides as Highly Efficient Catalysts, Joule, 2020, 4 (12), pp. 2562-2598, (2020).

(Continued)

*Primary Examiner* — Cam N. Nguyen
(74) *Attorney, Agent, or Firm* — ArentFox Schiff; Mark Duell

(57) ABSTRACT

A method for making a branched metal nanocatalyst including providing a first metal precursor solution having a first metal precursor, wherein providing the first metal precursor solution includes combining a first metal ion source and a first alkylamine, and providing a second metal precursor solution, wherein providing the second metal precursor solution includes combining a second metal ion source and a second alkylamine, heating the second metal precursor solution, combining the first metal precursor solution with the second metal precursor solution to provide a reaction solution, and holding the reaction solution at an elevated temperature for a reaction time to provide a branched metal nanocatalyst. Also described are nanocatalysts prepared according to the method.

17 Claims, 24 Drawing Sheets

(56) References Cited

U.S. PATENT DOCUMENTS

2022/0331788 A1* 10/2022 Chen .................. B01J 35/0033

OTHER PUBLICATIONS

Jun Watanabe et al., Surfactant-Assisted Synthesis of Pt Nanocubes Using Poly(N-isopropylac rylamide) Nanogels, Langmuir 2021, 37 (40), ( 14 Pages Total), (2021).
Liang Ma et al., Control Over the Branched Structures of Platinum Nanocrystals for Electrocatalytic Applications, ACS Nano 2012, 6 (11), (16 Pages Total), (2012).
Lise-Marie Lacroix et al., Tuning Complex Shapes in Platinum Nanoparticles: From Cubic Dendrites to Fivefold Stars, Angew. Chem. Int. Ed. 2012, 51, (17 Pages Total), (2012).
Mufan Li et al., Ultrafine jagged platinum nanowires enable ultra-high mass activity for the oxygen reduction reaction, Science 2016, vol. 354, Issue 6318, pp. 1414-1419, (2016).
Na Tian et al., Synthesis of Tetrahexahedral Platinum Nanocrystals with High-Index Facets and High Electro-Oxidation Activity, Science 2007, vol. 316, pp. 732-735, (2007).
Shutang Chen et al., Pt—Ni Seed-Core-Frame Hierarchical Nanostructures and Their Conversion to Na noframes for Enhanced Methanol Electro-Oxidation, Catalysts 2019, 9 (1), 39, (15 Pages Total), (2019).
Temer S. Ahmadi et al. , Shape-Controlled Synthesis of Colloidal Platinum Nanoparticles, Science 1996, vol. 272 (5270), pp. 1924-1926, (1996).
Yu Xia et al., Shape control of size-selected naked platinum nanocrystals, Nature Communications 2021, 12 (1), 3019, (8 Pages Total), (2021).
Zhi-You Zhou et al., Shape transformation from Pt nanocubes to tetrahexahedra with size near 10nm, Electrochemistry Communications 2012, 22, pp. 61-64, (2012).

* cited by examiner

METHOD FOR THE SYNTHESIS OF HIGH EFFICIENCY PT BRANCHED NANOCATALYSTS

TECHNICAL FIELD

The present disclosure is directed to the synthesis of branched metal nanocatalysts.

BACKGROUND

Platinum is considered one of the most active electrocatalysts in numerous applications, including the oxygen reduction reaction and the hydrogen evolution reaction in fuel cells. However, platinum catalysts are often associated with high costs and scarce reserves. In addition, while nanocrystal catalysts with high-index surfaces generally show excellent catalytic activity due to their high density of atomic steps and kinks, the preparation of platinum nanocrystals with high-index facets remails a challenge.

SUMMARY

The present disclosure is directed to a method for making a branched metal nanocatalyst having providing a first metal precursor solution having a first metal precursor, wherein providing the first metal precursor solution includes combining a first metal ion source and a first alkylamine, and providing a second metal precursor solution, wherein providing the second metal precursor solution includes combining a second metal ion source and a second alkylamine, heating the second metal precursor solution, combining the first metal precursor solution with the second metal precursor solution to provide a reaction solution, and holding the reaction solution at an elevated temperature for a reaction time to provide a branched metal nanocatalyst.

DETAILED DESCRIPTION

Figure 1:
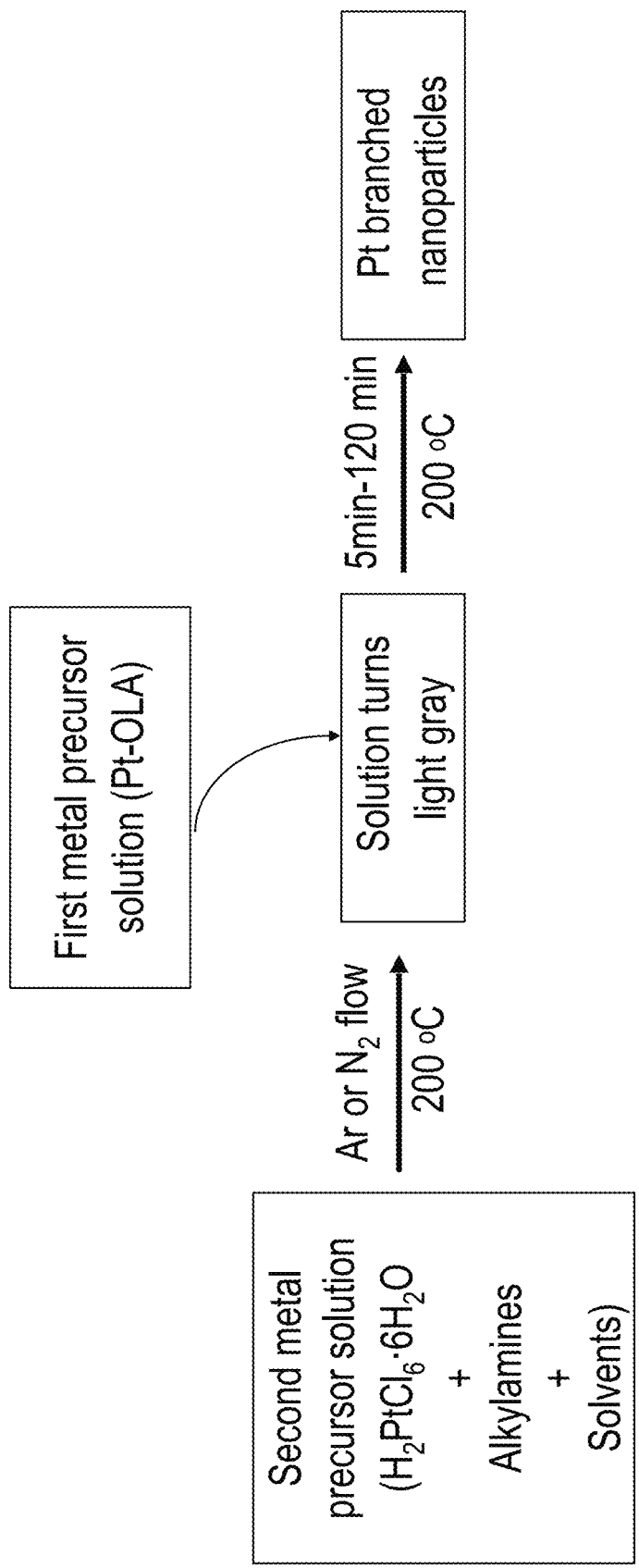
FIG. 1 shows an example schematic of a method according to aspects of the present disclosure.

The present disclosure is directed to a method for making a branched metal nanocatalyst, particularly nanocatalysts useful for catalyzing the oxygen reduction reaction and the hydrogen evolution reaction in fuel cells. The method may include providing a first metal precursor solution having a first metal precursor, and combining the first metal precursor solution with a heated second metal precursor solution having a second metal precursor in order to provide a reaction solution. According to some aspects, the first metal precursor solution may be provided by combining a first metal ion source and a first alkylamine, and the second metal precursor solution may be provided by combining a second metal ion source and a second alkylamine, wherein the first and second metal ion sources are the same or different, and independently, wherein the first and second alkylamines are the same or different. The method may further include holding the reaction solution at an elevated temperature for a reaction time followed by one or more washing steps to provide a branched metal nanocatalyst. The present disclosure is also directed to nanocatalysts prepared according to the present method and methods of using the same.

The method according to the present disclosure may include providing a first metal precursor solution having at least a first metal precursor. According to some aspects, the first metal precursor may include one or more ions of a first metal that is useful for a catalyst. Example metals useful as a catalyst include, but are not limited to, palladium, platinum, gold, ruthenium, rhodium, and iridium. In some preferred aspects, the first metal precursor may include platinum ions.

According to some aspects, the one or more first metal ions may be provided by a first metal ion source, such as a first metal compound. Non-limiting examples of metal compounds useful according to the present disclosure include, but are not limited to, metal chlorides, metal acetylacetonates, and metal salts. In some non-limiting examples, the first metal compound may include a hexachloroplatinate salt (e.g., sodium hexachloroplatinate hexahydrate), chloroplatinic acid hexahydrate, platinum chloride, platinum acetylacetonate, hydrates thereof, and combinations thereof.

The method may include combining the first metal ion source with at least a first alkylamine in order to provide the first metal precursor solution having the first metal precursor. Example alkylamines useful according to the present disclosure include, but are not limited to, oleylamine (OLA), hexadectylamine (HDA), dodecylamine (DDA), octadecylamine (ODA), tetradecylamine (TDA), and combinations thereof. According to some aspects, the first metal precursor may include a complex of the first metal ions and the first alkylamine as described herein, such as Pt-OLA, Pt-HDA, Pt-DDA, Pt-ODA, Pt-TDA, or a combination thereof. According to some aspects, the atomic molar ratio of first metal ion source to first alkylamine combined to provide the first metal precursor solution may be from about 1:1 to 1:200, optionally from about 1:10 to 1:160, optionally from about 1:10 to 1:50, optionally from about 1:50 to 1:100, and optionally from about 1:100 to 1:160. According to some aspects, the atomic molar ratio of first metal ion source to first alkylamine combined to provide the first metal precursor solution may be about 1:1, optionally about 1:10, optionally about 1:20, optionally about 1:30, optionally about 1:40, optionally about 1:50, optionally about 1:60, optionally about 1:70, optionally about 1:80, optionally about 1:90, optionally about 1:100, optionally about 1:110, optionally about 1:120, optionally about 1:130, optionally about 1:140, optionally about 1:150, and optionally about 1:160.

The method may include combining the first metal precursor solution with a second metal precursor solution having a second metal precursor. According to some aspects, the second metal precursor solution may be provided by combining a second metal ion source and a second alkylamine as described herein. It should be understood that the second metal ion source may be the same as or different from the first metal ion source. Independently, the second alkylamine may be the same as or different from the first alkylamine as described herein. According to some aspects, the atomic molar ratio of second metal ion source to second alkylamine combined to provide the first metal precursor solution may be from about 1:1 to 1:500, optionally from about 1:10 to 1:360, optionally from about 1:10 to 1:50, optionally from about 1:50 to 1:100, optionally from about 1:100 to 1:150, optionally from about 1:150 to 1:200, optionally from about 1:200 to 1:250, optionally from about 1:250 to 1:300, and optionally from about 1:300 to 1:360. According to some aspects, the atomic molar ratio of second metal ion source to second alkylamine combined to provide the first metal precursor solution may be about 1:1, optionally about 1:10, optionally about 1:20, optionally about 1:30, optionally about 1:40, optionally about 1:50, optionally about 1:60, optionally about 1:70, optionally about 1:80, optionally about 1:90, optionally about 1:100, optionally about 1:110, optionally about 1:120, optionally about 1:130, optionally about 1:140, optionally about 1:150, optionally about 1:160, optionally about 1:170, optionally about 1:180, optionally about 1:190, optionally about 1:200, optionally about 1:210, optionally about 1:220, optionally about 1:230, optionally about 1:240, optionally about 1:250, optionally about 1:260, optionally about 1:270, optionally about 1:280, optionally about 1:290, optionally about 1:300, optionally about 1:310, optionally about 1:320, optionally about 1:330, optionally about 1:340, optionally about 1:350, and optionally about 1:360.

According to some aspects, oxygen may be removed from the first metal precursor solution and/or the second metal precursor solution as known in the art. For example, the method may include combining the first metal ion source and the first alkylamine under an inert gas flow. Additionally or alternatively, the method may include combining the second metal ion source and the second alkylamine under an inert gas flow. Examples of inert gases include, but are not limited to, nitrogen gas, argon gas, and combinations thereof.

According to some aspects, the second metal precursor solution may be heated. In some non-limiting examples, the second metal precursor solution may be heated to a temperature of between about 100 and 300° C., optionally between about 150 and 250° C., optionally between about 175 and 225° C., and optionally about 200° C. According to some aspects, the second metal precursor solution may be heated. In some non-limiting examples, the second metal precursor solution may be heated to a temperature of between about 100 and 200° C. According to some aspects, the second metal precursor solution may be heated to a temperature of at least about 100° C., optionally at least about 110° C., optionally at least about 120° C., optionally at least about 130° C., optionally at least about 140° C., optionally at least about 150° C., optionally at least about 160° C., optionally at least about 170° C., optionally at least about 180° C., optionally at least about 190° C., and optionally at least about 200° C.

According to some aspects, the first metal precursor solution and/or the second metal precursor solution may include one or more solvents. Non-limiting examples of solvents useful in the first metal precursor solution and/or second metal precursor solution include, but are not limited to, octadecene, anisole, phenyl ether, and combinations thereof.

The method may include combining the first metal precursor solution with the heated second metal precursor solution to provide a reaction solution. According to some aspects, the first metal precursor solution may be optionally heated prior to combination with the second metal precursor solution. In some non-limiting examples, the first metal precursor solution may be heated to a temperature of between about 25 and 300° C., and optionally between about 25 and 250° C. According to some aspects, the second metal precursor solution may be heated to a temperature of at least about 25° C., optionally at least about 30° C., optionally at least about 40° C., optionally at least about 50° C., optionally at least about 60° C., optionally at least about 70° C., optionally at least about 80° C., optionally at least about 90° C., optionally at least about 100° C., optionally at least about 110° C., optionally at least about 120° C., optionally at least about 130° C., optionally at least about 140° C., optionally at least about 150° C., optionally at least about 160° C., optionally at least about 170° C., optionally at least about 180° C., optionally at least about 190° C., optionally at least about 200° C., optionally at least about 210° C., optionally at least about 220° C., optionally at least about 230° C., optionally at least about 240° C., and optionally at least about 250° C. Alternatively, first metal precursor solution may not be heated prior to combination with the second metal precursor solution. In this example, the first metal precursor solution may be combined with the second metal precursor solution at room temperature, that is, about 20 to 25° C.

According to some aspects, the concentration of metal ions in the reaction solution may be selected in order to provide certain features of the resulting branched metal nanocatalysts as described herein. In some non-limiting examples, increasing the concentration of the first metal ions and/or the second metal ions provided to the reaction solution may, at least in part, shorten the branch length of the resulting metal nanocatalysts. Without wishing to be bound by theory, it is believed that the concentration of metal ions may affect metal nanocatalyst nucleation and/or growth rate. In particular, it is believed that a higher metal ion concentration may provide a slower nucleation and/or growth rate when compared with lower concentrations. It should be understood that the concentration of the first metal ions in the reaction solution will correspond with the concentration of the first metal precursor provided to the reaction solution. Similarly, the concentration of the second metal ions in the reaction solution will correspond with the concentration of the second metal precursor provided to the reaction solution.

In some non-limiting examples, the concentration of first metal precursor provided to the reaction solution may be between about 1 and 200 mg/mL, optionally between about 1 and 150 mg/mL, optionally between about 1 and 100 mg/mL, optionally between about 1 and 50 mg/mL, optionally between about 1 and 25 mg/mL, optionally between about 25 and 50 mg/mL, optionally between about 50 and 100 mg/mL, optionally between 50 and 75 mg/mL, and optionally between about 75 and 100 mg/mL. In some non-limiting examples, the concentration of first metal precursor provided to the reaction solution may be about 10 mg/mL, optionally about 15 mg/mL, optionally about 20 mg/mL, optionally about 25 mg/mL, optionally about 30 mg/mL, optionally about 35 mg/mL, optionally about 40 mg/mL, optionally about 45 mg/mL, optionally about 50 mg/mL, optionally about 55 mg/mL, optionally about 60 mg/mL, optionally about 65 mg/mL, optionally about 70 mg/mL, optionally about 75 mg/mL, optionally about 80 mg/mL, optionally about 85 mg/mL, optionally about 90 mg/mL, optionally about 95 mg/mL, and optionally about 100 mg/mL.

In some non-limiting examples, the concentration of the second metal precursor provided to the reaction solution may be between about 1.0 and 516 mg/mL, optionally between about 3.0 and 208 mg/mL, optionally between about 6.0 and 104 mg/mL, and optionally between about 13 and 52 mg/mL.

According to some aspects, the first metal precursor solution and the heated second metal precursor solution may be combined under an inert gas flow as described herein. According to some aspects, the method may further include holding the reaction solution at an elevated temperature for a reaction time.

The elevated temperature may be between about 100 and 300° C., optionally between about 150 and 250° C., optionally between about 175 and 225° C., and optionally about 200° C. According to some aspects, the elevated temperature may be at least about 100° C., optionally at least about 110° C., optionally at least about 120° C., optionally at least about 130° C., optionally at least about 140° C., optionally at least about 150° C., optionally at least about 160° C., optionally at least about 170° C., optionally at least about 180° C., optionally at least about 190° C., and optionally at least about 200° C.

The reaction time may be between about 1 minute and 3 hours, optionally between about 1 and 150 minutes, and optionally between about 5 and 120 minutes.

It should be understood that the method described herein may be a one-pot method. As used herein, the term "one-pot method" refers to a method wherein one or more reactants are subjected to one or more successive chemical reactions in a single reactor, that is, without requiring intermittent purification steps.

The method may further include one or more washing steps to provide an isolated metal nanocatalyst. According to some aspects, the one or more washing steps may include combining the reaction solution with a solvent, centrifuging the solution, and/or discarding the supernatant as known in the art. According to some aspects, the reaction solution may be cooled prior to one or more of the one or more washing steps. For example, the reaction solution may be cooled by at least about 20° C., optionally at least about 30° C., at least about 40° C., at least about 50° C., at least about 60° C., at least about 70° C., at least about 80° C., at least about 90° C., at least about 100° C., and at least about 110° C.

According to some aspects, the one or more washing steps may include combining the reaction solution with a solvent. In some non-limiting examples, the solvent may include at least one hydrophobic solvent, at least one organic solvent, or a combination thereof. Example hydrophobic solvents useful according to the present disclosure include, but are not limited to, hexane, benzene, toluene, xylene, chlorobenzene, dichlorobenzene, trichlorobenzene, cyclohexane, carbon tetrachloride chloroform, and combinations thereof. Example organic solvents useful according to the present disclosure include, but are not limited to, aromatic compounds (e.g., benzene, toluene), alcohols (e.g. ethanol, methanol), esters, ethers, ketones (e.g., acetone), amines, nitrated and halogenated hydrocarbons, and combinations thereof. It should be understood that the resulting product may be stored in a solvent as described herein, as known in the art.

FIG. 1 shows a non-limiting example schematic of a method as described herein. As shown in FIG. 1, the method may include providing a first metal precursor solution having Pt-OLA, wherein the first metal precursor solution is provided by combining chloroplatinic acid hexahydrate and OLA as described herein. The method may further include heating a second metal precursor solution provided by combining $H_2PtCl_6 \cdot 6H_2O$, an alkylamine, and a solvent as described herein, and combining the heated second metal precursor solution with the first metal precursor solution. The resulting reaction solution may be held at an elevated temperature for a reaction time as described herein in order to provide platinum branched nanoparticles.

Figure 2A:
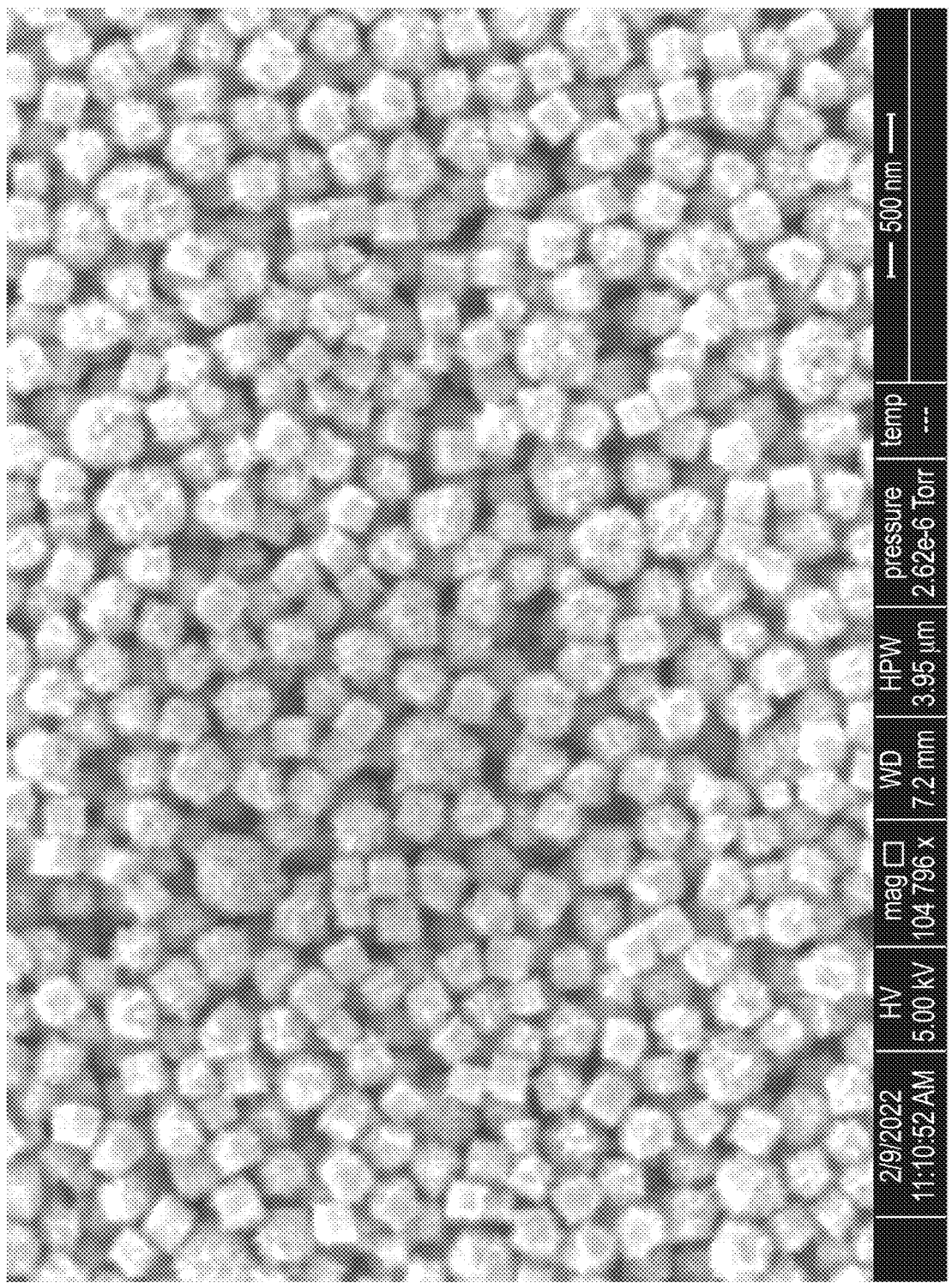
FIG. 2A shows an example scanning electron microscopy (SEM) image of platinum branched nanoparticles according to aspects of the present disclosure.
Figure 2B:
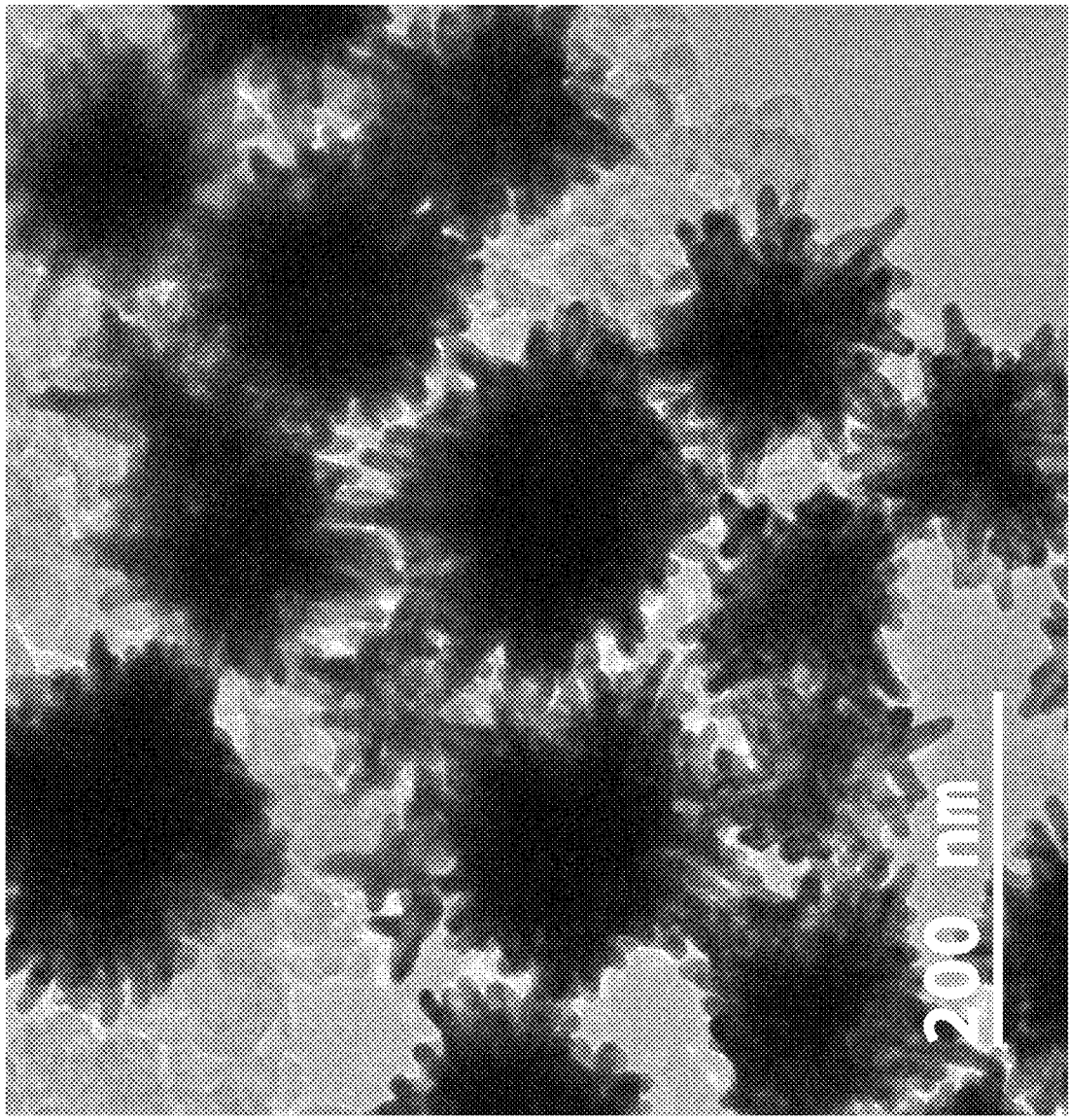
FIG. 2B shows an example transmission electron microscopy (TEM) image of platinum branched nanoparticles according to aspects of the present disclosure.

FIGS. 2A and 2B show example platinum branched nanoparticles that may be provided by the method shown in FIG. 1. In particular, FIG. 2A shows a scanning electron microscopy (SEM) image of the platinum branched nanoparticles, and FIG. 2B shows a transmission electron microscopy (TEM) image of the platinum branched nanoparticles.

The present disclosure is also directed to nanocatalysts prepared according to the present method. As used herein, the term "catalyst" refers to a component that directs, provokes, or speeds up a chemical reaction. As used herein, a "nanocatalyst" refers to a catalyst having one or more nanostructures. It should be understood that example nanostructures include, but are not limited to, nanosheets, nanocubes, nanoparticles, nanospheres, nanowires, nanofibers, and combinations thereof. A nanocube may include a cube having a size on the nanoscale. A nanowire may include a wire having a diameter on the nanoscale. A nanoparticle may include a particle wherein each spatial dimension thereof is on the nanoscale. According to some aspects, the nanostructure may include a nanocrystal, that is, a nanostructure bound by crystal facets.

The nanocatalysts according to the present disclosure may have an average size of between 1 and 1000 nm, optionally between about 1 and 500 nm, optionally between about 50 and 200 nm, and optionally between about 100 and 150 nm. The nanocatalysts according to the present disclosure may have an average size of about 1 nm, optionally about 10 nm, optionally about 20 nm, optionally about 30 nm, optionally about 40 nm, optionally about 50 nm, optionally about 60 nm, optionally about 70 nm, optionally about 80 nm, optionally about 90 nm, optionally about 100 nm, optionally about 110 nm, optionally about 120 nm, optionally about 130 nm, optionally about 140 nm, optionally about 150 nm, optionally about 160 nm, optionally about 170 nm, optionally about 180 nm, optionally about 190 nm, and optionally about 200 nm.

According to some aspects, the nanocatalysts according to the present disclosure may have a branched structure. It should be understood that a "branched" structure refers to a dendritic structure, that is, a structure having one or more branches.

According to some aspects, the nanocatalysts according to the present disclosure may include one or more branched nanocrystals enclosed by high-index facets. As used herein, the term "high-index facet" refers to a facet denoted by a set of Miller indices {hkl} with at least one index greater than unity.

The nanocatalysts prepared according to the present disclosure may meet or exceed catalytic requirements for mass-specific activity as known in the art. For example, the nanocatalysts of the present disclosure may meet or exceed Department of Energy (DOE) requirements for nanocatalysts as known in the art. In one non-limiting example, the nanocatalysts according to the present disclosure may have a mass activity (MA) of at least 0.44 $A/mg_{Pt}$ at 0.9 V with <40% loss in initial activity after 100,000 cycles in proton exchange membrane fuel cells (PEMFCs), optionally at least about 0.5 $A/mg_{Pt}$, optionally at least about 0.6 $A/mg_{Pt}$, optionally at least about 0.7 $A/mg_{Pt}$, optionally at least about 0.8 $A/mg_{Pt}$, optionally at least about 0.9 $A/mg_{Pt}$, optionally at least about 1.0 $A/mg_{Pt}$, optionally at least about 1.1 $A/mg_{Pt}$, optionally at least about 1.2 $A/mg_{Pt}$, optionally at least about 1.3 $A/mg_{Pt}$, optionally at least about 1.4 $A/mg_{Pt}$, optionally at least about 1.5 $A/mg_{Pt}$, optionally at least about 1.6 $A/mg_{Pt}$, optionally at least about 1.7 $A/mg_{Pt}$, optionally at least about 1.8 $A/mg_{Pt}$, optionally at least about 1.9 $A/mg_{Pt}$, optionally at least about 2.0 $A/mg_{Pt}$, optionally at least about 2.1 $A/mg_{Pt}$, optionally at least about 2.2 $A/mg_{Pt}$, optionally at least about 2.3 $A/mg_{Pt}$, optionally at least about 2.4 $A/mg_{Pt}$, and optionally at least about 2.5 $A/mg_{Pt}$.

The present disclosure is also directed to methods of using nanocatalysts prepared according to the present method. In some non-limiting examples, the method may include providing the nanocatalysts as part of a PEMFC, and in particular, as part of an electrode of a PEMFC. According to some aspects, an electrode of a PEMFC as described herein may include at least one support (e.g., a carbon support), at least one binder, and/or one or more nanocatalysts as described herein. The present disclosure is also directed to PEMFCs and PEMFC electrodes having one or more nanocatalysts as described herein.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Herein, the recitation of numerical ranges by endpoints (e.g. between about 50:1 and 1:1, between about 100 and 500° C., between about 1 minute and 60 minutes) include all numbers subsumed within that range, for example, between about 1 minute and 60 minutes includes 21, 22, 23, and 24 minutes as endpoints within the specified range. Thus, for example, ranges 22-36, 25-32, 23-29, etc. are also ranges with endpoints subsumed within the range 1-60 depending on the starting materials used, temperature, specific applications, specific embodiments, or limitations of the claims if needed. The Examples and methods disclosed herein demonstrate the recited ranges subsume every point within the ranges because different synthetic products result from changing one or more reaction parameters. Further, the methods and Examples disclosed herein describe various aspects of the disclosed ranges and the effects if the ranges are changed individually or in combination with other recited ranges.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

As used herein, the term "about" and "approximately" are defined to being close to as understood by one of ordinary skill in the art. In one non-limiting embodiment, the term "about" and "approximately" are defined to be within 10%, preferably within 5%, more preferably within 1%, and most preferably within 0.5%.

The examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, dimensions, etc.) but some experimental errors and deviations should be accounted for.

EXAMPLES

Example I: Synthesis of Platinum Branched Nanoparticles Using HDA

First, four aliquots of a Pt-OLA precursor stock solution was prepared by combing 2.0 mL OLA (70%) with an amount of chloroplatinic acid hexahydrate sufficient to provide a Pt-OLA concentration of 103 mg/mL, 53 mg/mL, 26 mg/mL, or 10 mg/mL, respectively. The aliquots were then heated to a temperature of less than 200° C. and shaken for 5 minutes.

Then, a second metal precursor solution was prepared by loading 5.0 g of HDA (90%) and 51.7 mg of chloroplatinic acid hexahydrate into a 50 mL three-neck flask, where oxygen was removed through argon blowing for 20 minutes. The second metal precursor solution was heated to 200° C., at which point it turned light gray.

Then, 3.0 mL of the 103 mg/mL Pt-OLA precursor stock solution was injected into the flask under argon flow to provide a reaction solution. After 20 minutes at 200° C., the reaction solution was cooled to 80° C., and a solvent of 5 mL of hexane and 5 mL of ethanol was injected. The products were separated by centrifuging at 3000 rpm for 2 minutes. The supernatant was discarded, and 10 mL of hexane was then added to the sediment. The mixture was centrifuged at 4000 rpm for 5 minutes. The washing procedure was repeated twice to remove unreacted precursors and surfactant. The resulting platinum branched nanoparticles were stored in hydrophobic solvents before characterization.

This process was then repeated three more times using the 53 mg/mL, 26 mg/mL, or 10 mg/mL Pt-OLA stock solution aliquots respectively.

Example II: Characterization of Platinum Branched Nanoparticles

The surface morphologies of the platinum branched nanoparticles prepared in Example I were investigated by a scanning electron microscope (SEM, QUANTA FEG 650) from FEI with a field emitter as electron source. A Bruker D8 Advance X-ray diffractometer with Cu Kα radiation operated at a tube voltage of 40 kV and a current of 40 mA was used to obtain X-ray diffraction (XRD) patterns. Transmission electron microscopy (TEM) images were captured using an FEI Tecnai 20 microscope with an accelerating voltage of 200 kV.

Figure 3A:
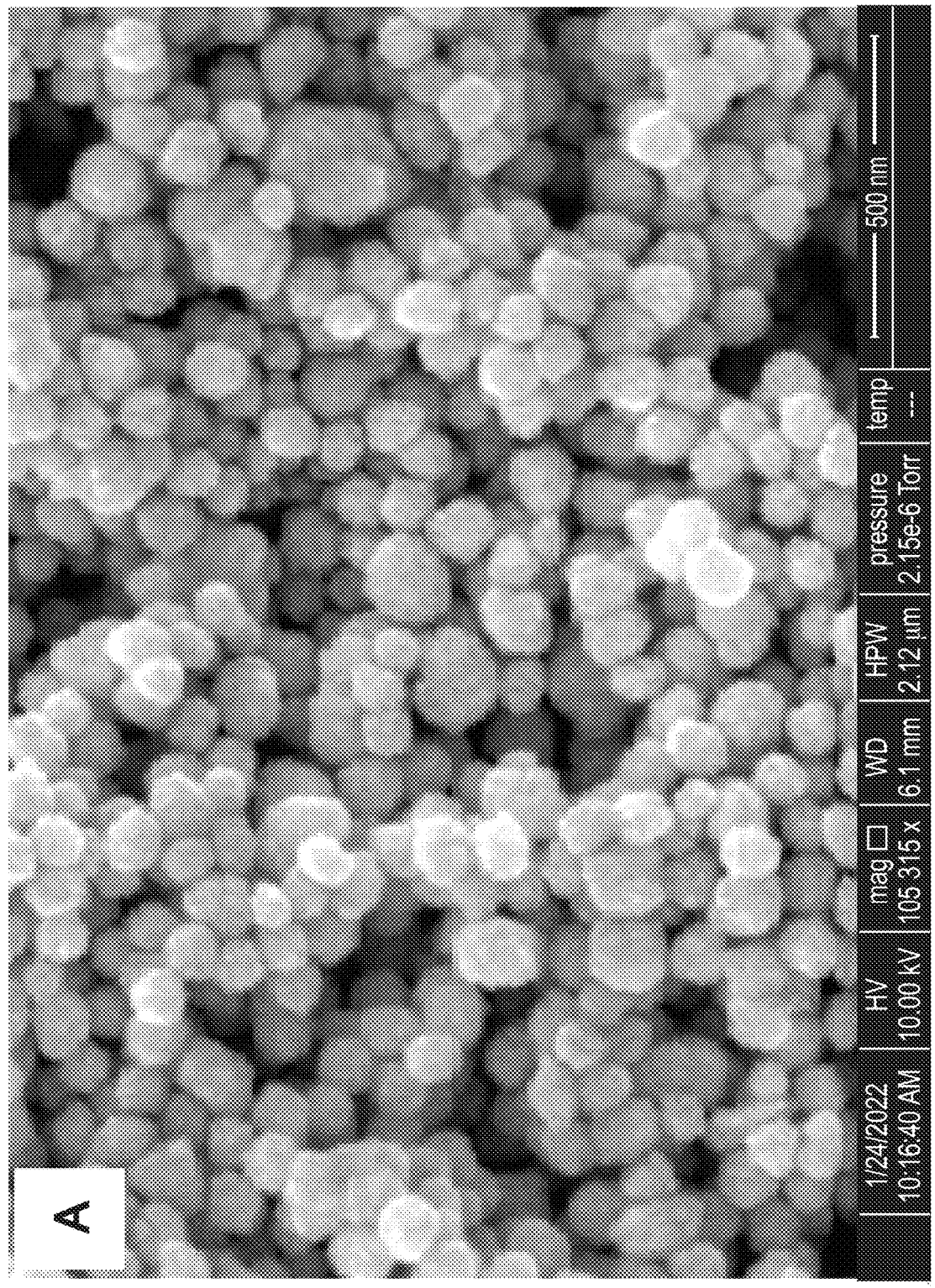
FIG. 3A shows nanoparticles prepared using the 103 mg/mL Pt-OLA precursor stock solution aliquot from Example I.
Figure 3B:
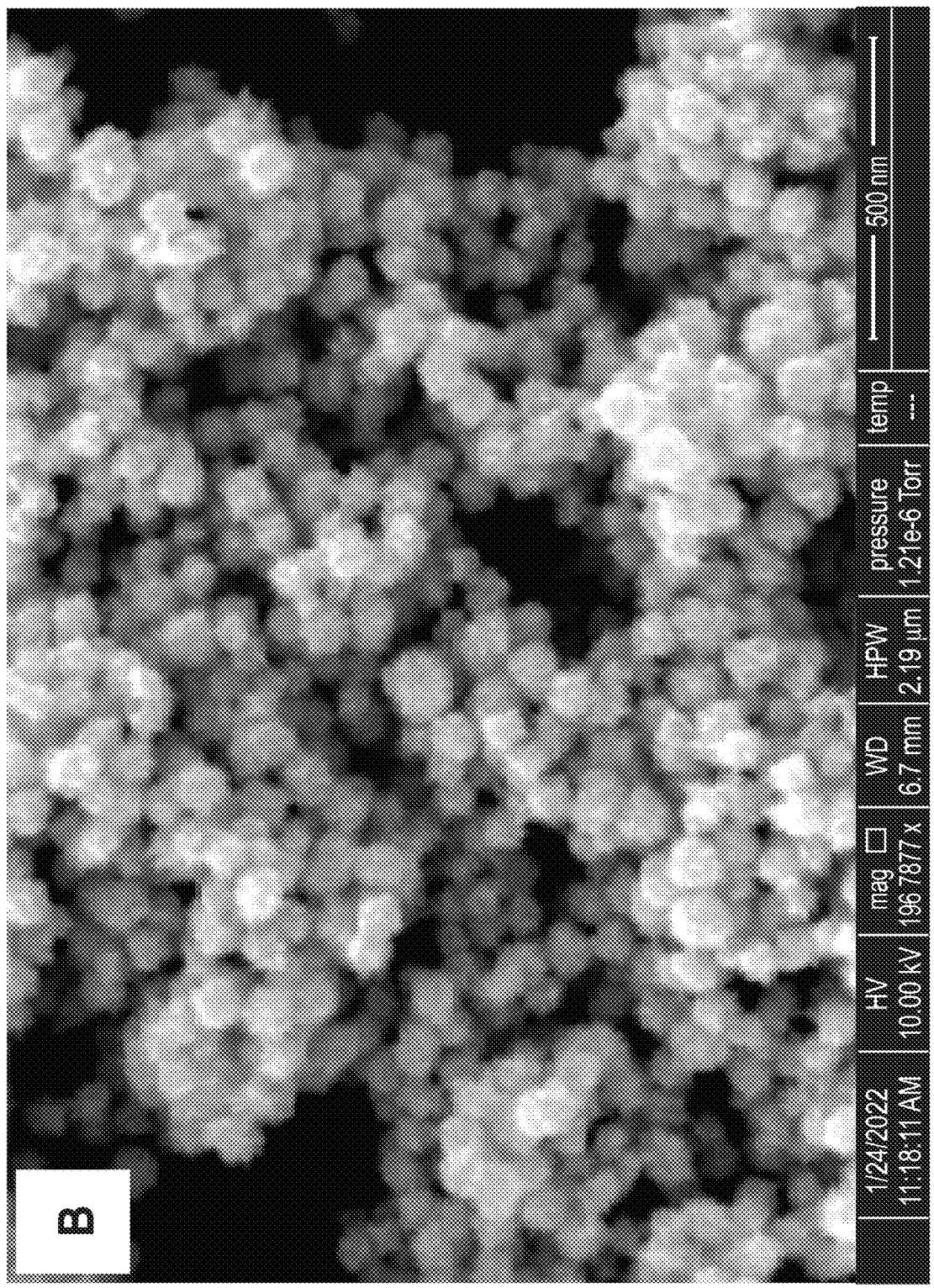
FIG. 3B shows the nanoparticles prepared using the 53 mg/mL Pt-OLA precursor stock solution aliquot from Example I.
Figure 3C:
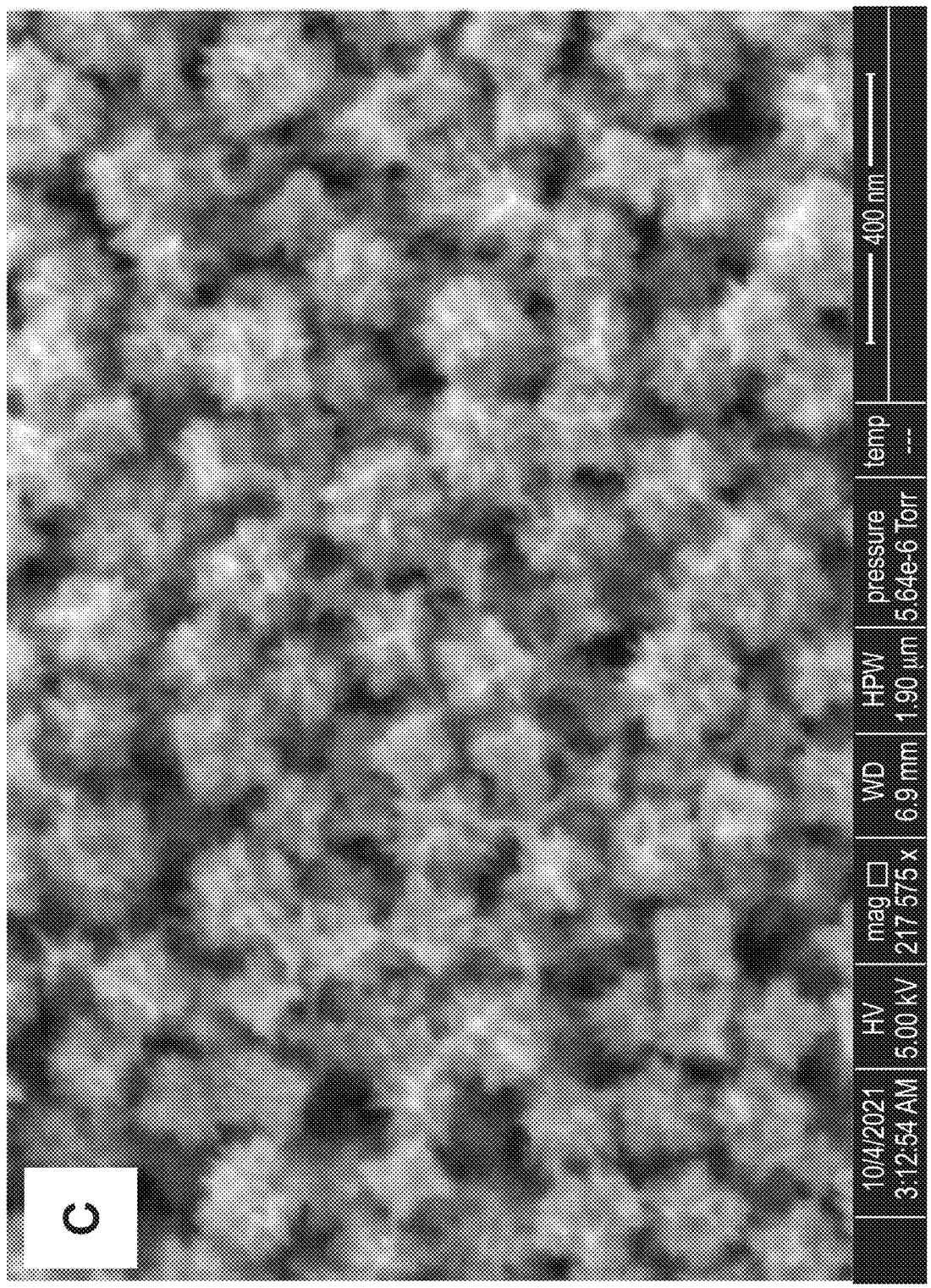
FIG. 3C shows the nanoparticles prepared using the 26 mg/mL Pt-OLA precursor stock solution aliquot from Example I.
Figure 3D:
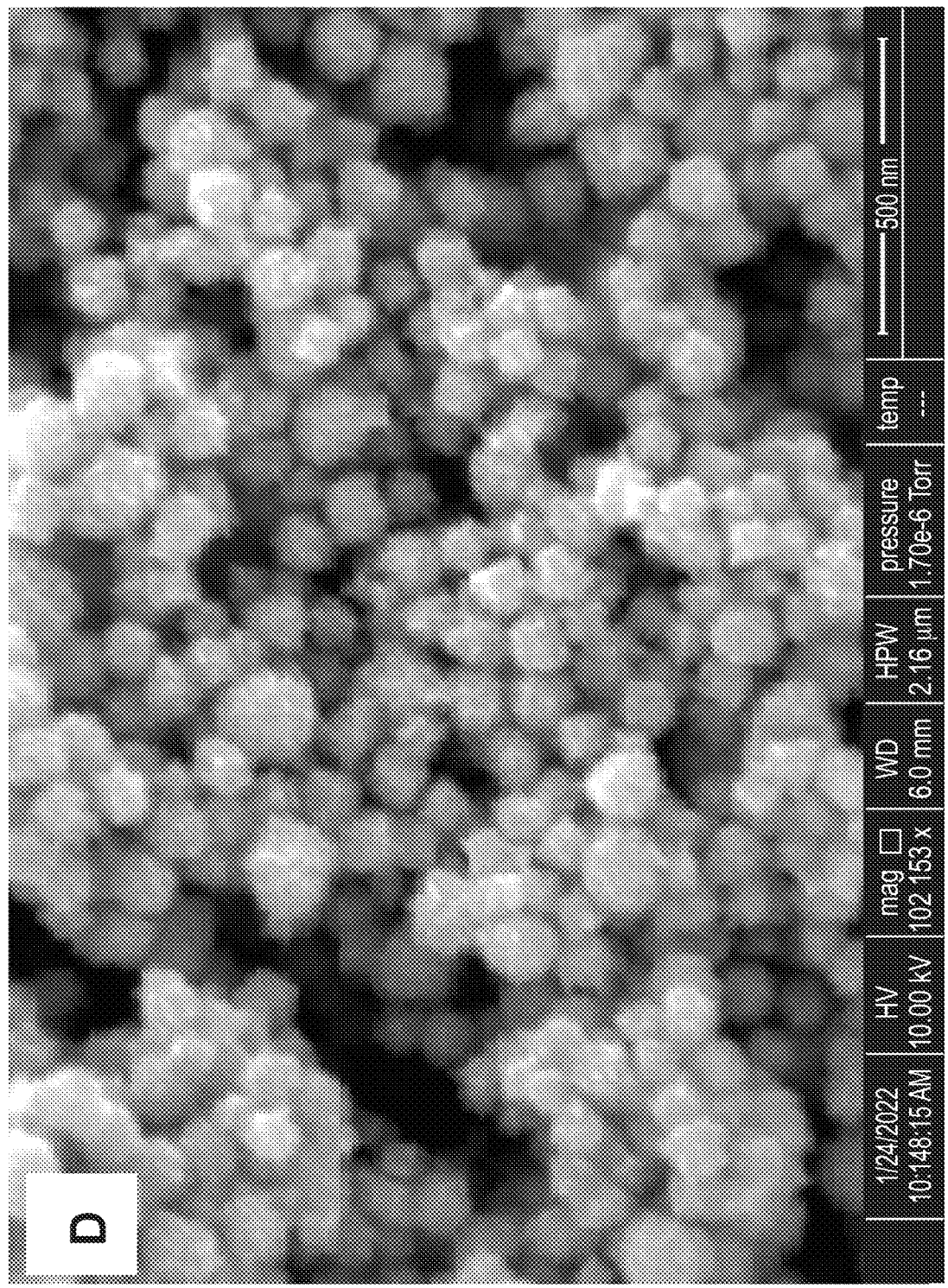
FIG. 3D shows the nanoparticles prepared using the 10 mg/mL Pt-OLA precursor stock solution aliquot from Example I.

FIGS. 3A-3D show SEM images of the platinum branched nanoparticles prepared according to Example I. Specifically, FIG. 3A shows the nanoparticles prepared using the 103 mg/mL Pt-OLA precursor stock solution aliquot from Example I. FIG. 3B shows the nanoparticles prepared using the 53 mg/mL Pt-OLA precursor stock solution aliquot from Example I. FIG. 3C shows the nanoparticles prepared using the 26 mg/mL Pt-OLA precursor stock solution aliquot from Example I. FIG. 3D shows the nanoparticles prepared using the 10 mg/mL Pt-OLA precursor stock solution aliquot from Example I.

Figure 4:
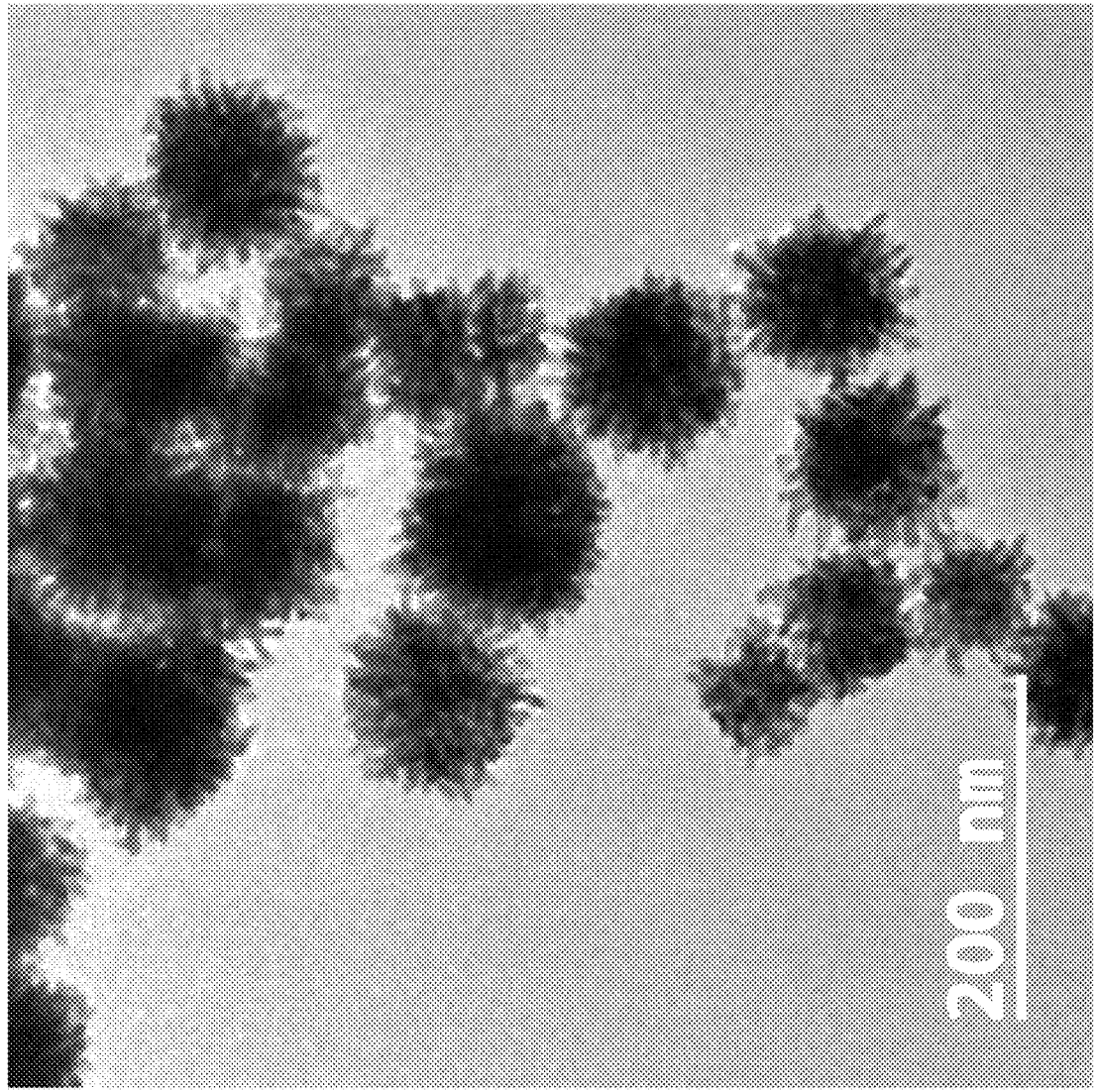
FIG. 4 shows a TEM image of the nanoparticles prepared using the 26 mg/mL Pt-OLA precursor stock solution aliquot from Example I.

FIG. 4 shows a TEM image of the nanoparticles prepared using the 26 mg/mL Pt-OLA precursor stock solution aliquot from Example I.

It was observed from the SEM images that all of the concentrations of Pt-OLA studied in Example I provided nanoparticles having relatively the same morphology, that is, having a dendritic structure and an average size of about 130 nm. However, as the concentration of Pt-OLA increased, individual branches contained by the nanoparticles boldened and shortened. It was thus concluded that Pt ion concentration impacted the nanoparticles' nucleation and growth rates.

Figure 5A:
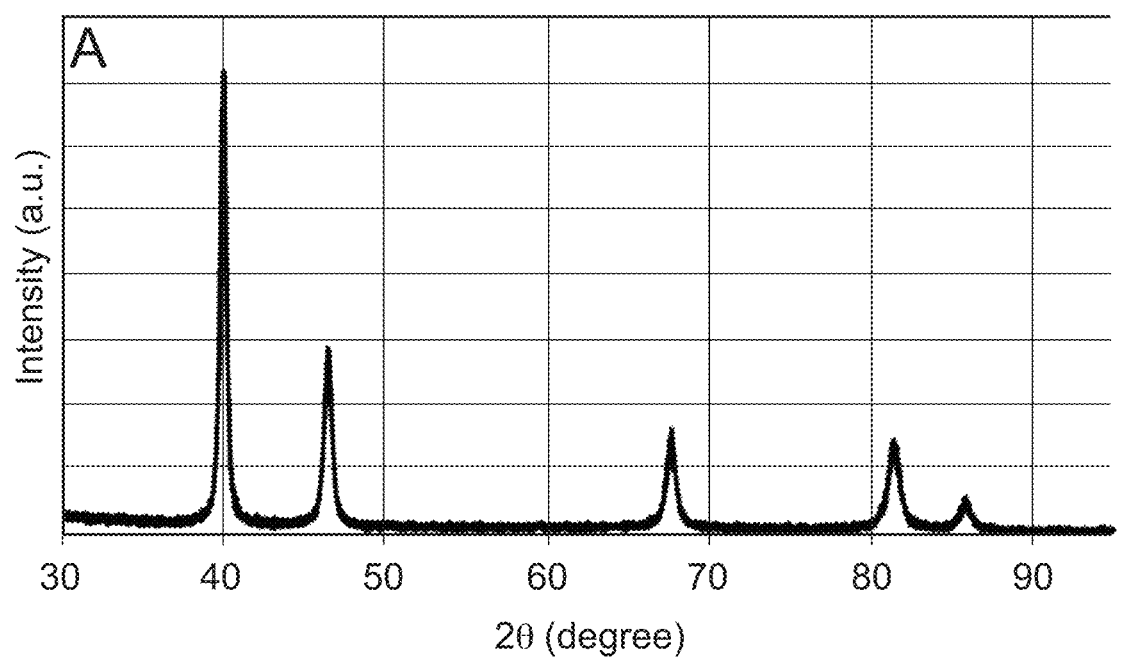
FIG. 5A shows the XRD pattern corresponding with the nanoparticles prepared using the 10 mg/mL Pt-OLA precursor stock solution aliquot from Example I.
Figure 5B:
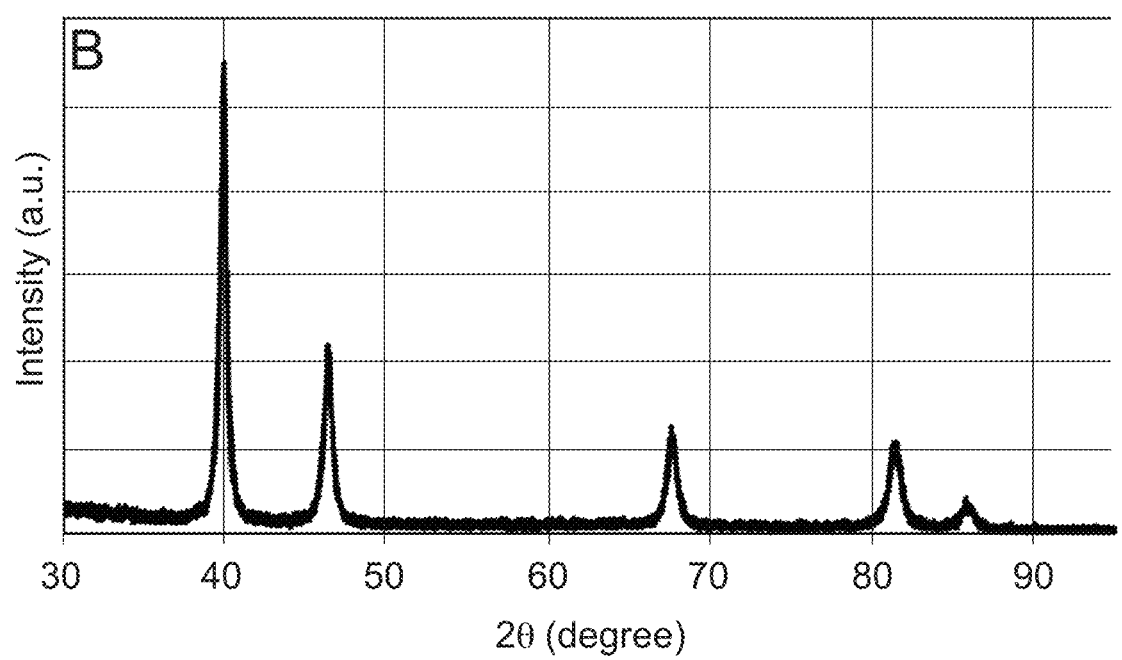
FIG. 5B shows the XRD pattern corresponding with nanoparticles prepared using the 26 mg/mL Pt-OLA precursor stock solution aliquot from Example I.
Figure 5C:
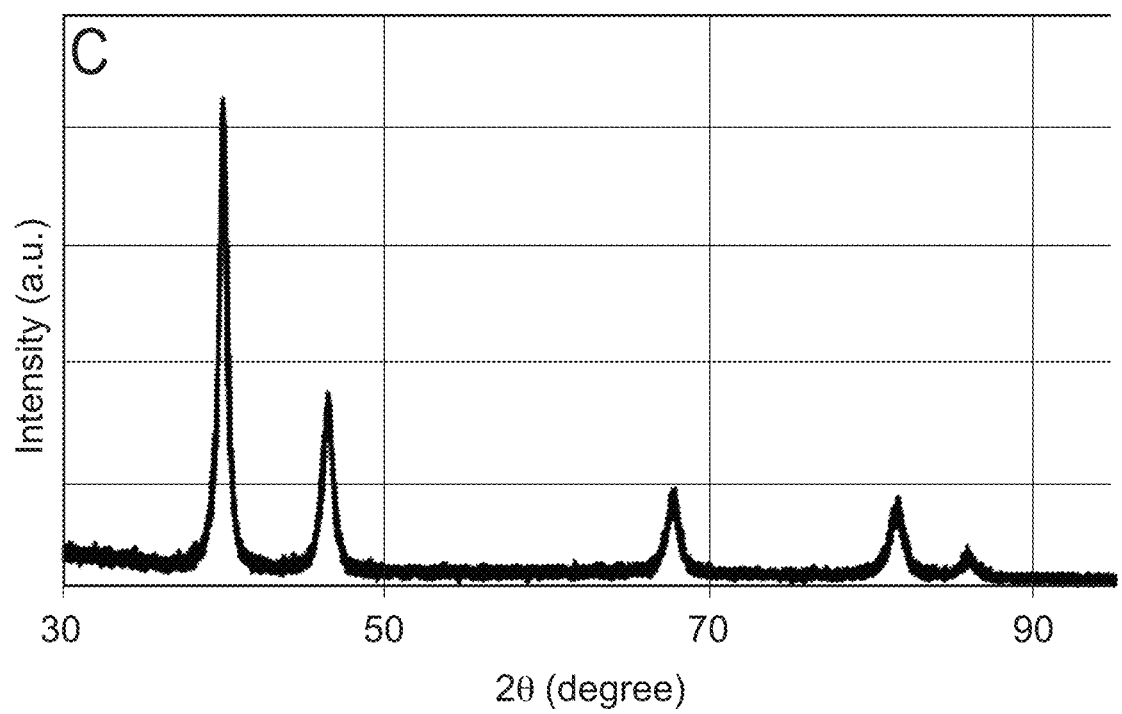
FIG. 5C shows the XRD pattern corresponding with nanoparticles prepared using the 53 mg/mL Pt-OLA precursor stock solution aliquot from Example I.
Figure 5D:
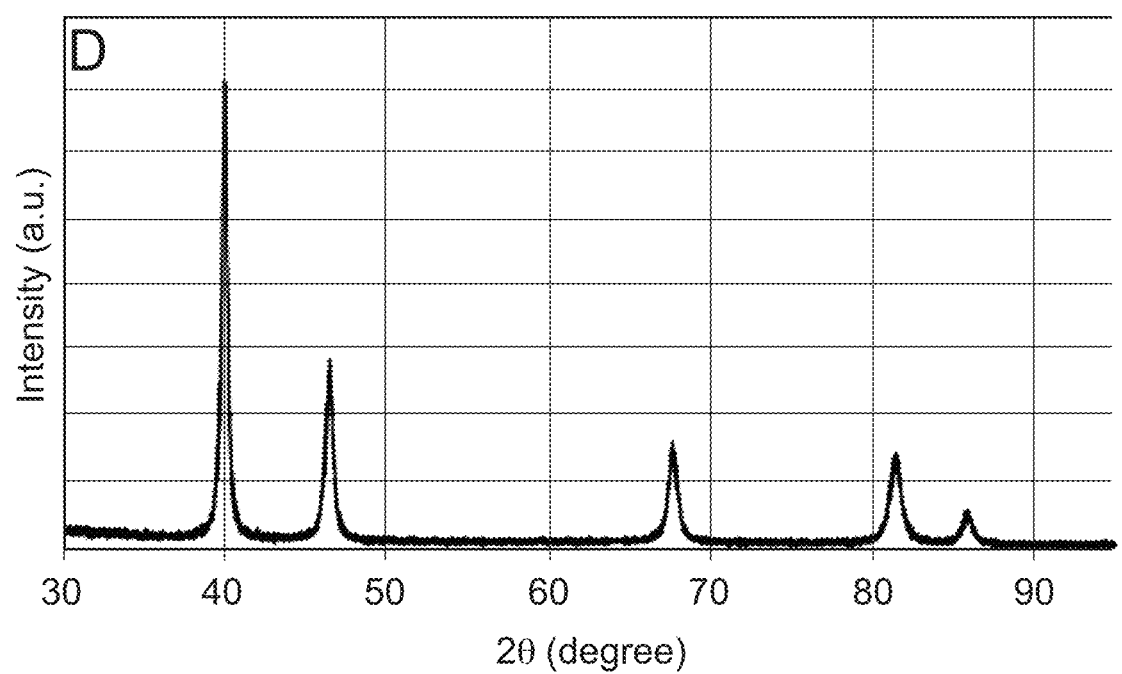
FIG. 5D shows the XRD pattern corresponding with nanoparticles prepared using the 103 mg/mL Pt-OLA precursor stock solution aliquot from Example I.

FIGS. 5A-5D show XRD patterns corresponding with the platinum branched nanoparticles prepared according to Example I. Specifically, FIG. 5A shows the XRD pattern corresponding with the nanoparticles prepared using the 10 mg/mL Pt-OLA precursor stock solution aliquot from Example I. FIG. 5B shows the XRD pattern corresponding with nanoparticles prepared using the 26 mg/mL Pt-OLA precursor stock solution aliquot from Example I. FIG. 5C shows the XRD pattern corresponding with nanoparticles prepared using the 53 mg/mL Pt-OLA precursor stock solution aliquot from Example I. FIG. 5D shows the XRD pattern corresponding with nanoparticles prepared using the 103 mg/mL Pt-OLA precursor stock solution aliquot from Example I.

It was observed that all four XRD patterns had {111}, {200}, {220}, {311}, and {222} diffraction peaks, which was consistent with a face centered cubic structure. The only difference between the XRD patterns was the full width at half maximum, which is believed to be due to various sizes of individual branches.

Example III: Electrochemical Measurements on Platinum Branched Nanoparticles All electrochemical measurements were taken on an electrochemical workstation at room temperature (25° C.), using a three electrode electrochemical setup with a rotating disk electrode (RDE) system. A glassy carbon working electrode (GCE, 5 mm inner diameter, 0.196 cm$^2$), a graphite rod counter electrode, and a 3.0 M KCl saturated Ag/AgCl reference electrode were used for all the tests. All potentials in this work are quoted with respect to a reversible hydrogen electrode (RHE). The cyclic voltammetry (CV) scan was performed at a rate of 50 mV s−1 near the thermodynamic potential of the H+/H2 reaction. The potential at the zero current point was chosen as the reaction potential of the hydrogen electrode. The potential at the zero current point was determined to be −0.287 V, so the potential measured with a Ag/AgCl electrode can be related by E (RHE)=E (Ag/AgCl)+0.287 V.

To perform the electrochemical measurements, branched nanoparticles prepared using the 26 mg/mL Pt-OLA aliquot according to Example I were first loaded onto the commercial carbon support (XC-72R) to provide a good dispersion. To prepare the electrode, a catalyst ink was prepared by ultrasonicating a mixture of catalyst and a water, isopropanol, nafion solution (5 wt %) for 30 minutes. Then, 10 μL of the catalyst ink was pipetted onto the support surface. Finally, the support surface was dried under ambient conditions. The Pt loading for the catalyst was kept at 17 µg cm², which was further determined by ICP-MS measurements.

Figure 6:
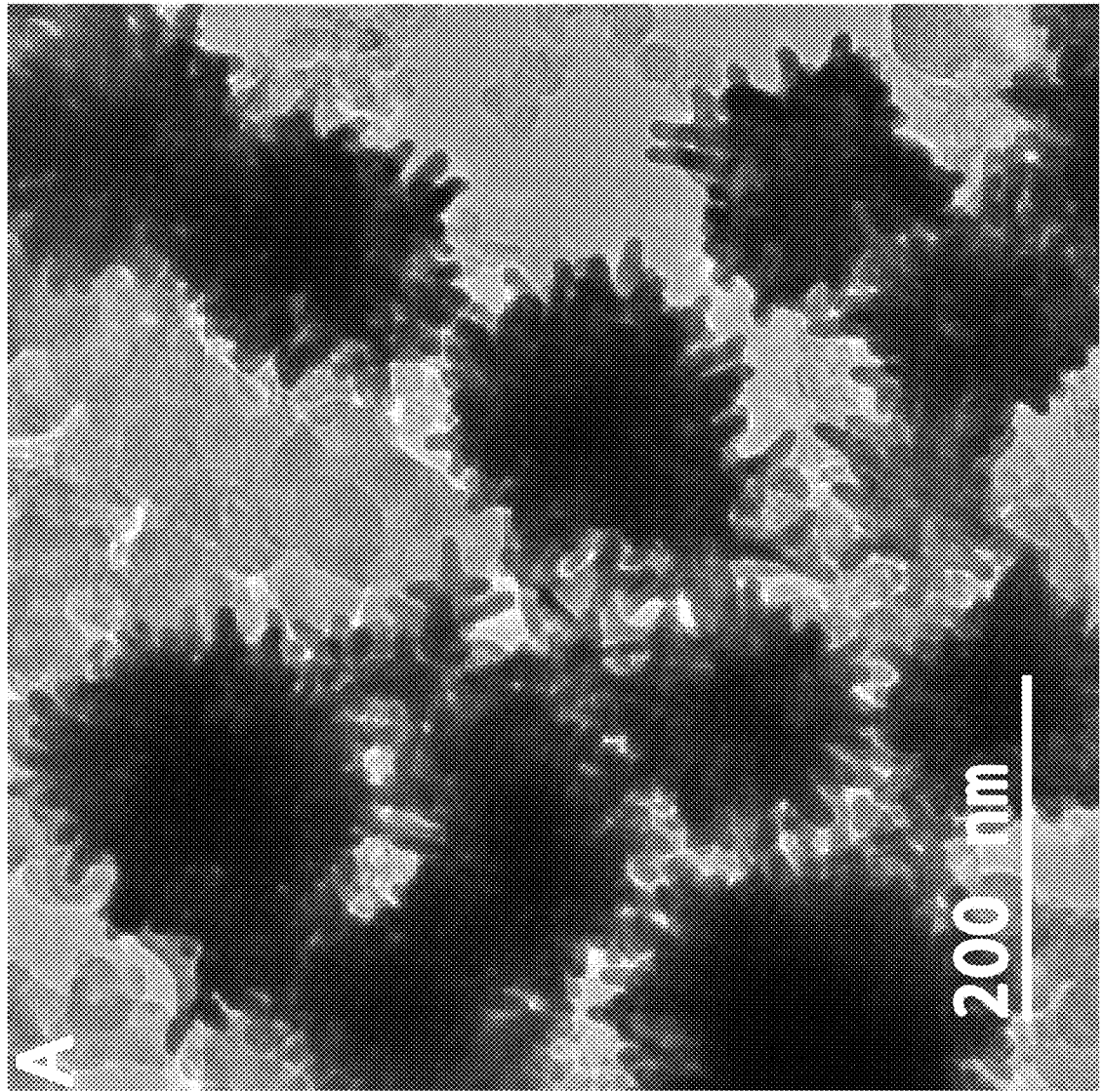
FIG. 6 shows a TEM image of the platinum branched nanocatalysts on the carbon surface as described in Example III.

FIG. 6 shows a TEM image of the platinum branched nanocatalysts on the carbon surface.

CV characterization of the catalysts in the absence of oxygen was carried out in the potential range of 0.1-1.1 V (vs. RHE) at a scan rate of 50 mV s−1 in a $N_2$-saturated 0.1 M $HClO_4$ solution. The ORR polarization curves were recorded in an $O_2$-saturated 0.1 M $HClO_4$ electrolyte at a rotation speed of 1600 rpm and a scan rate of 10 mV s$^{-1}$. For the CV activation and ORR process of Pt—Ni nanocatalysts, the inherent ORR activity of the catalysts was selected, so the ORR activity was conducted immediately after a ten-cycle CV activation. The durability testing was performed in an $O_2$-saturated 0.1 M $HClO_4$ solution in the voltage range of 0.6-1.0 V at room temperature. After the durability test, the catalysts were collected by sonicating the support surface in ethanol for further structural and compositional analysis. The electrocatalytic properties of Pt branched nanocatalysts were compared with commercial state-of-the-art Pt/C nanoscale electrocatalysts.

Figure 7:
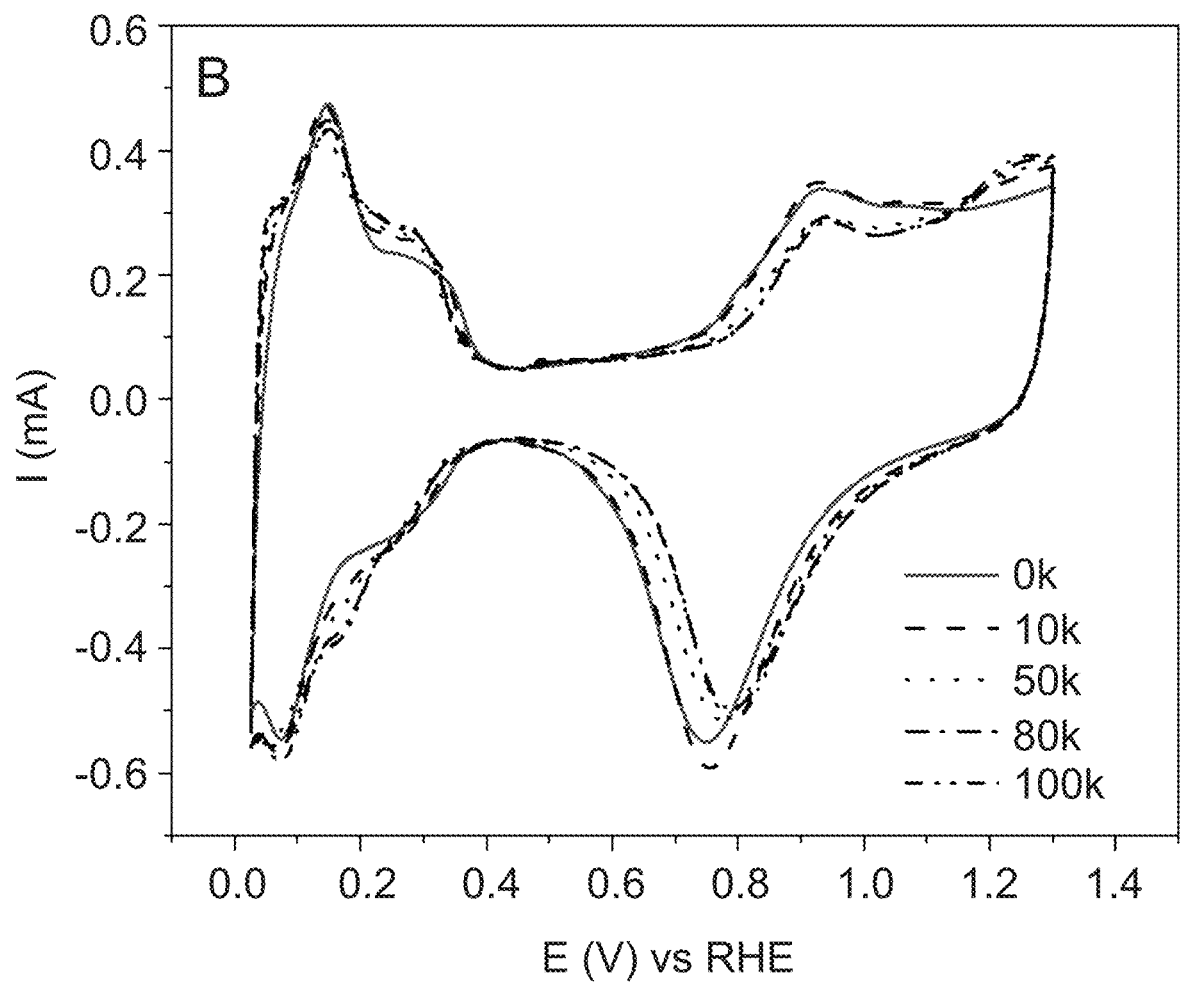
FIG. 7 shows the cyclic voltammetry curves as described in Example III.

As shown in FIG. 7, cyclic voltammetry curves indicated area specific activity loss was negligible after 100,000 potential cycles.

Figure 8:
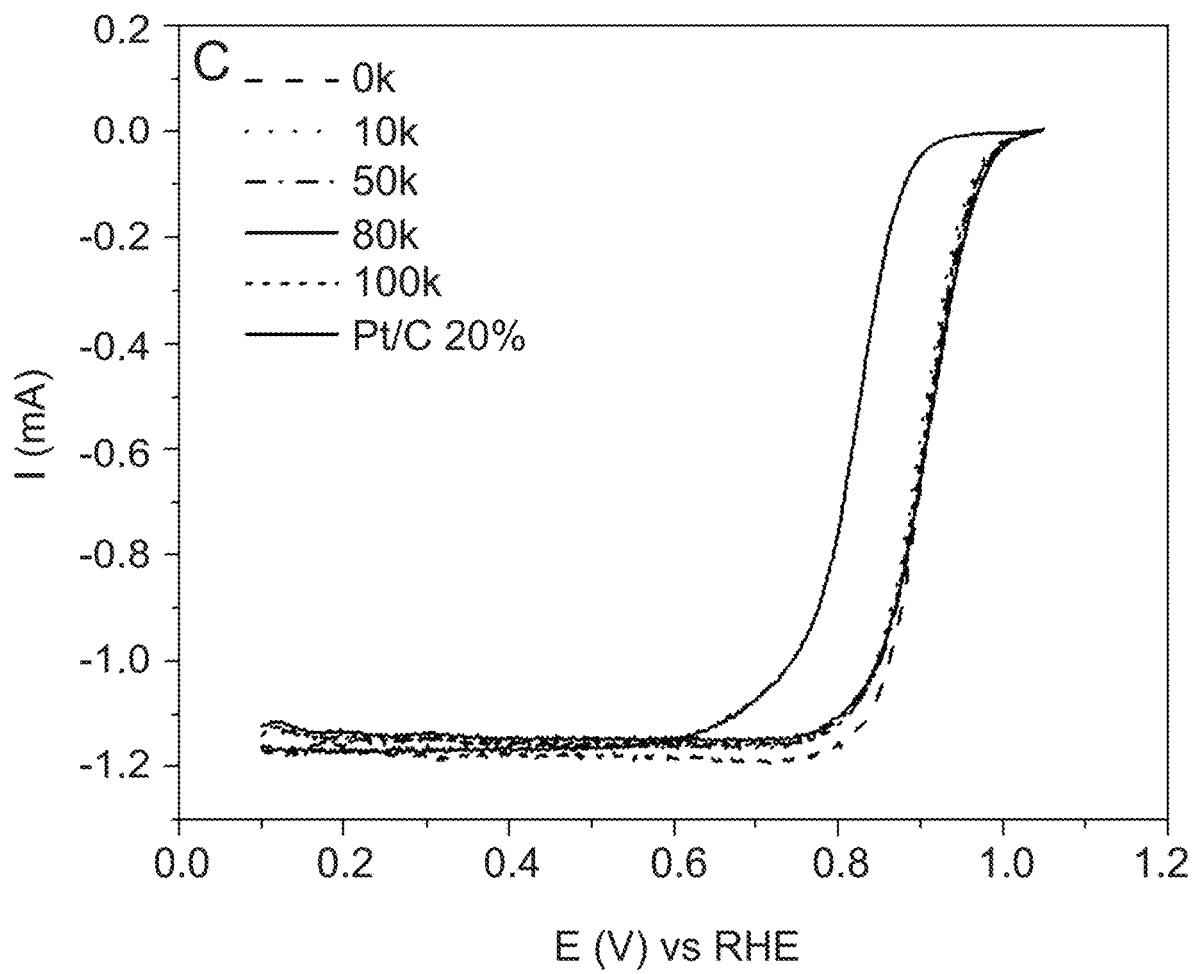
FIG. 8 shows linear sweeping voltammetry curves as described in Example III.

FIG. 8 shows linear sweeping voltammetry curves of the Pt branched nanocatalysts. At the initial stage, the mass activity of the Pt branched nanocatalysts was 2.1 A/mgPt. After the prolonged durability test for 100,000 cycles, oxygen reduction reaction performance of the Pt branched nanocatalysts was still better than that of commercial Pt/C (0.12 A/mgPt, initial activity).

Figure 9:
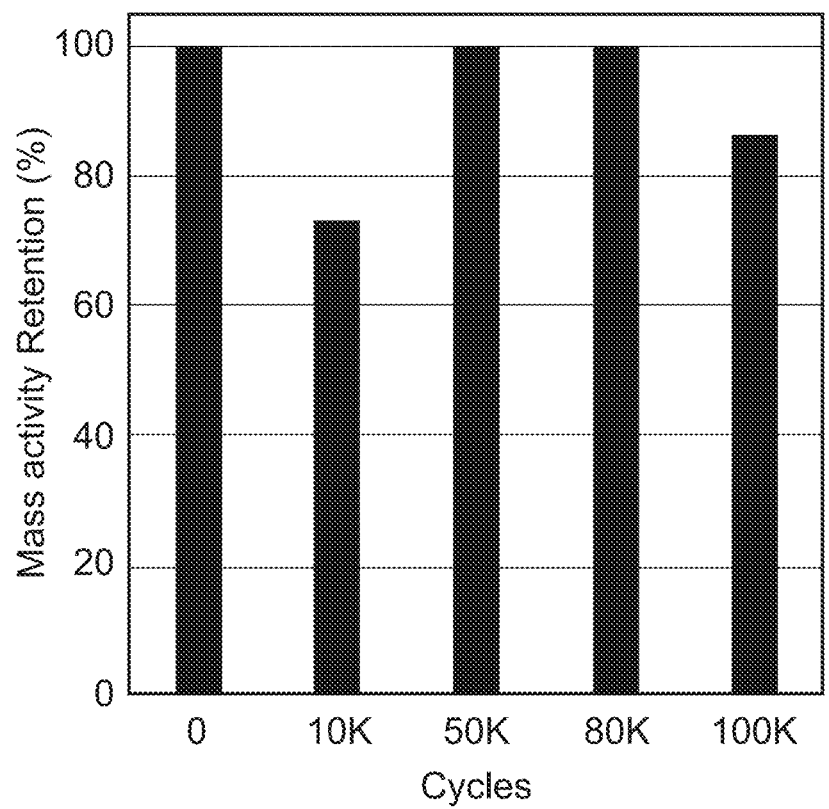
FIG. 9 shows the mass activity of platinum branched nanocatalysts as described in Example III.

Moreover, as shown in FIG. 9, mass activity of Pt branched nanocatalysts remained at 84% after 100,000 cycles, which exceeds DOE requirements for the further membrane electrode assembly test. Specifically, DOE sets technical targets on mass activity of 0.44 A/mgPt at 0.9 V with <40% loss in initial activity after 30,000 cycles in PEMFCs.

Example IV: Synthesis of Platinum Branched Nanoparticles Using DDA

First, to prepare a Pt-OLA precursor stock solution, 52 mg of chloroplatinic acid hexahydrate (0.1 mmol) and 2.0 mL OLA (70%) were heated to a temperature of less than 200° C. and shaken for 5 minutes. Then, the stock solution was diluted to a Pt-OLA concentration of 26 mg/mL.

Then, a second metal precursor solution was prepared by loading 5.0 g of DDA and 51.7 mg of chloroplatinic acid hexahydrate into a 50 mL three-neck flask, where oxygen was removed through argon blowing for 20 minutes. The second metal precursor solution was heated to 200° C., at which point it turned light gray. Then, 3.0 mL of the Pt-OLA precursor stock solution was injected into the flask under argon flow to provide a reaction solution.

After 20 minutes at 200° C., the reaction solution was cooled to 80° C., and a solvent of 5 mL of hexane and 5 mL of ethanol was injected. The products were separated by centrifuging at 3000 rpm for 2 minutes. The supernatant was discarded, and 10 mL of hexane was then added to the sediment. The mixture was centrifuged at 4000 rpm for 5 minutes. The washing procedure was repeated twice to remove unreacted precursors and surfactant. The platinum branched nanoparticles were stored in hydrophobic solvents before characterization.

Figure 10A:
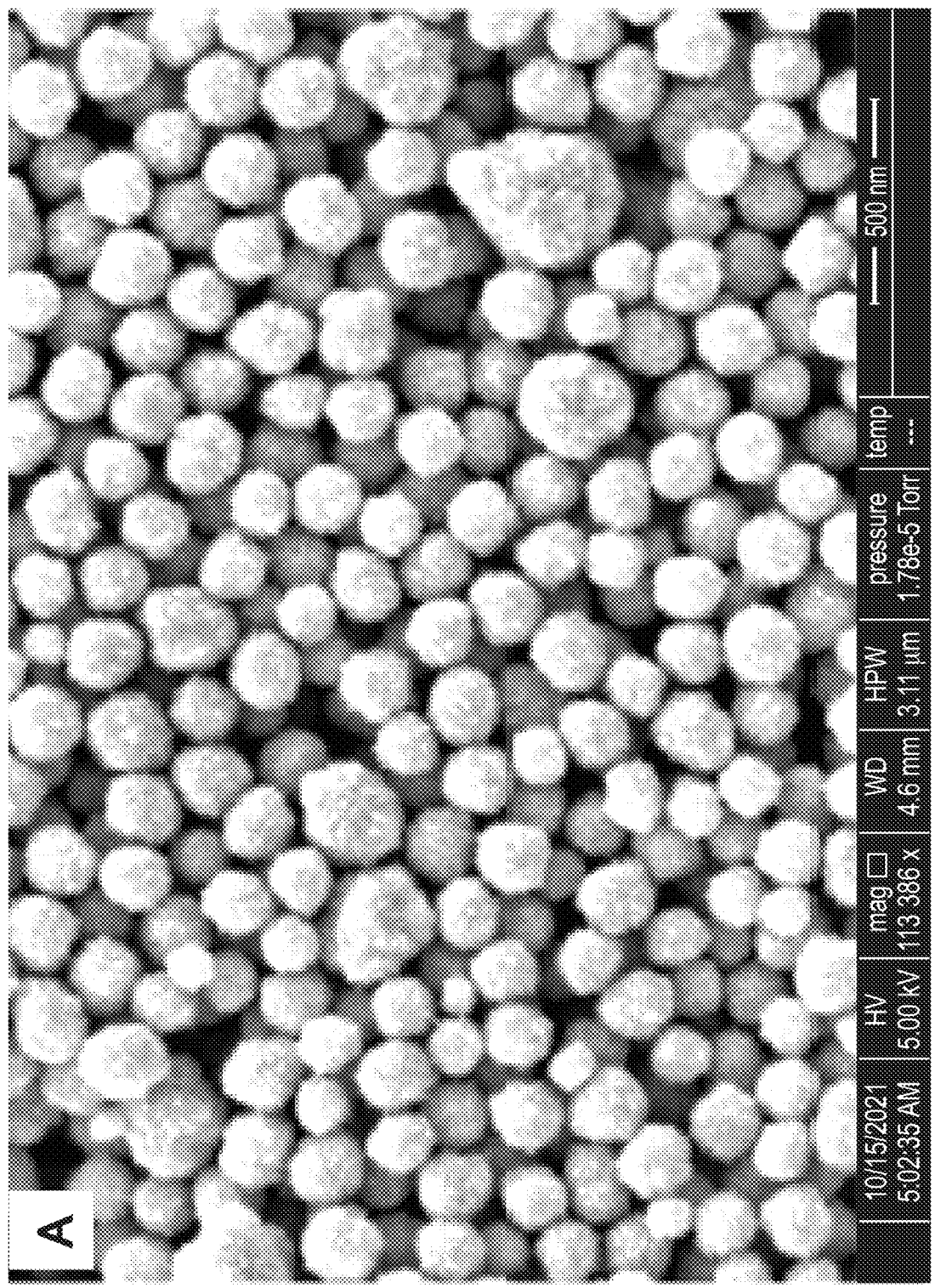
FIG. 10A shows an SEM image as described in Example V.
Figure 10B:
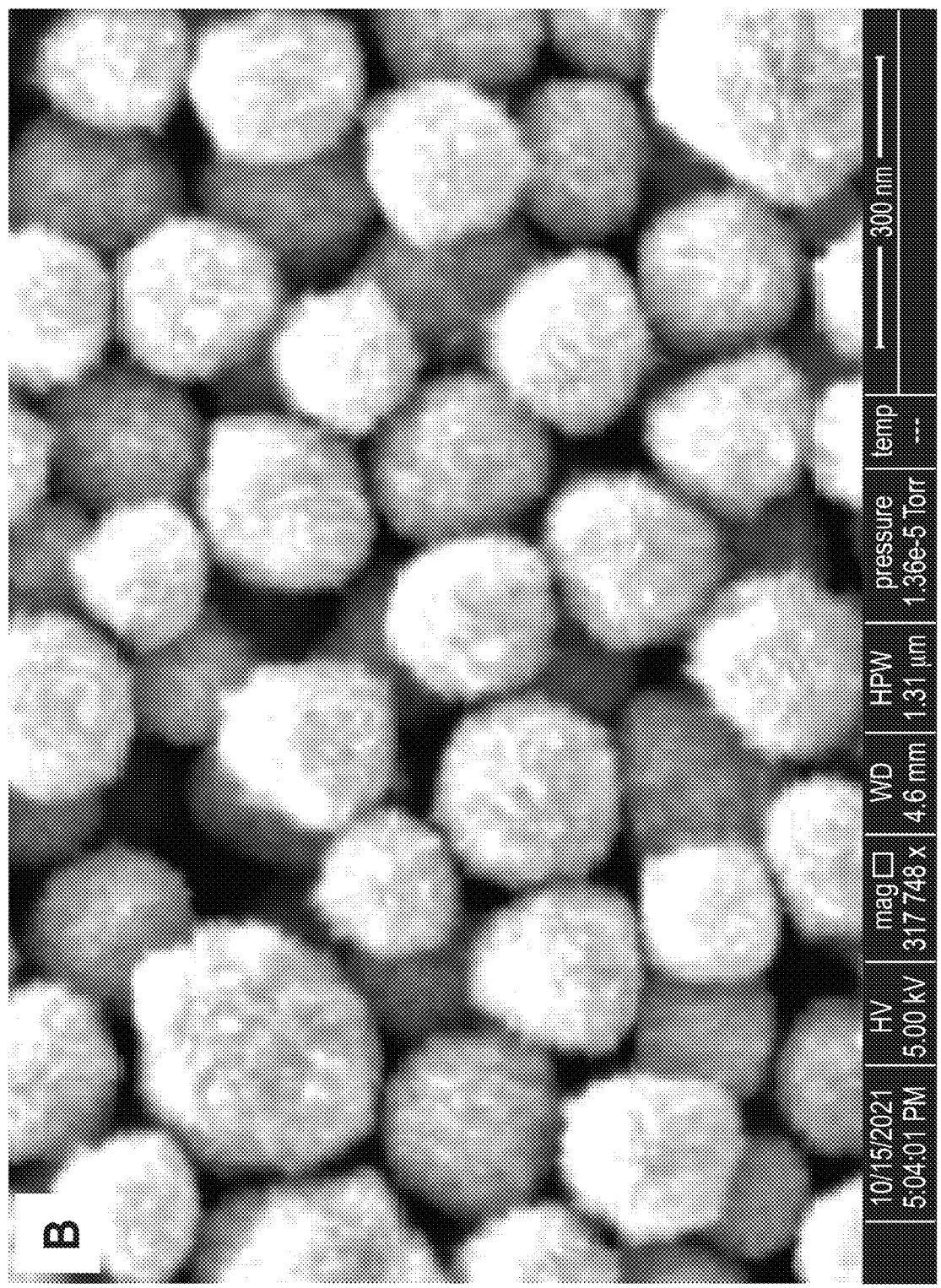
FIG. 10B shows an SEM image as described in Example V.
Figure 11:
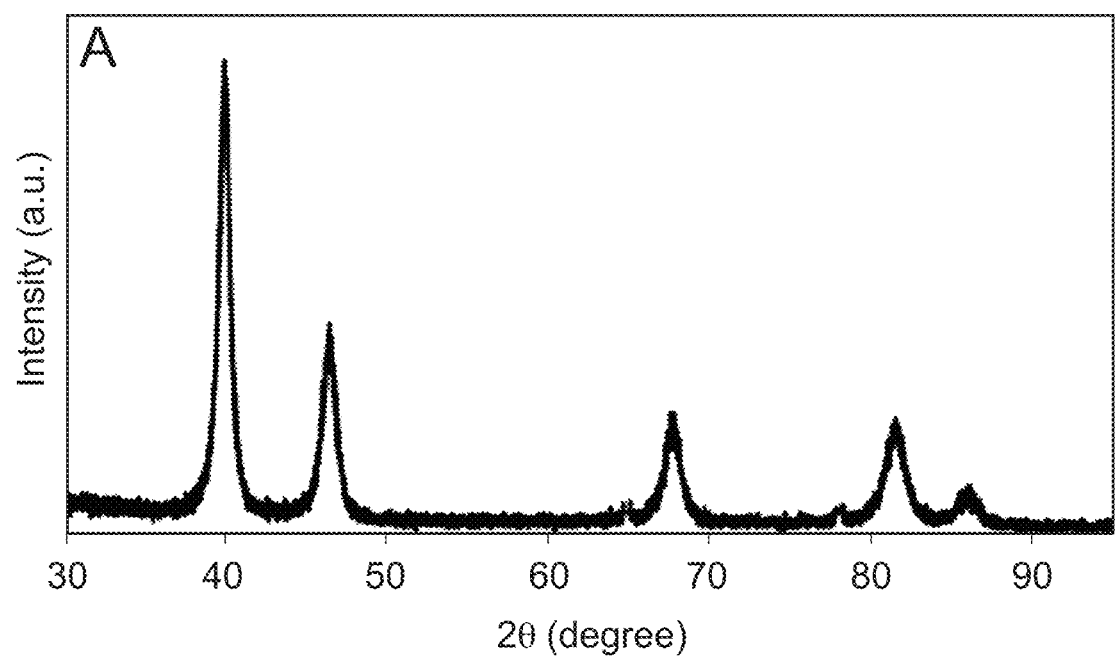
FIG. 11 shows an XRD pattern as described in Example V.

FIGS. 10A and 10B show SEM images of the resulting Pt branched nanostructures. FIG. 11 shows the XRD pattern corresponding with the resulting Pt branched nanostructures. There were {111}, {200}, {220}, {311}, and {222} diffraction peaks observed in the XRD pattern, which was consistent with the Pt branched nanoparticles synthesized using HDA as described in Example I.

Example VI: Synthesis of Platinum Branched Nanoparticles Using TDA

First, to prepare a Pt-OLA precursor stock solution, 52 mg of chloroplatinic acid hexahydrate (0.1 mmol) and 2.0 mL OLA (70%) were heated to a temperature of less than 200° C. and shaken for 5 minutes. Then, the stock solution was diluted to a Pt-OLA concentration of 26 mg/mL.

Then, a second metal precursor solution was prepared by loading 5.0 g of TDA (>96%) and 51.7 mg of chloroplatinic acid hexahydrate into a 50 mL three-neck flask, where oxygen was removed through argon blowing for 20 minutes. The second metal precursor solution was heated to 200° C., at which point it turned light gray. Then, 3.0 mL of the Pt-OLA precursor stock solution was injected into the flask under argon flow to provide a reaction solution.

After 20 minutes at 200° C., the reaction solution was cooled to 80° C., and a solvent of 5 mL of hexane and 5 mL of ethanol was injected. The products were separated by centrifuging at 3000 rpm for 2 minutes. The supernatant was discarded, and 10 mL of hexane was then added to the sediment. The mixture was centrifuged at 4000 rpm for 5 minutes. The washing procedure was repeated twice to remove unreacted precursors and surfactant. The platinum branched nanoparticles were stored in hydrophobic solvents before characterization.

Figure 12A:
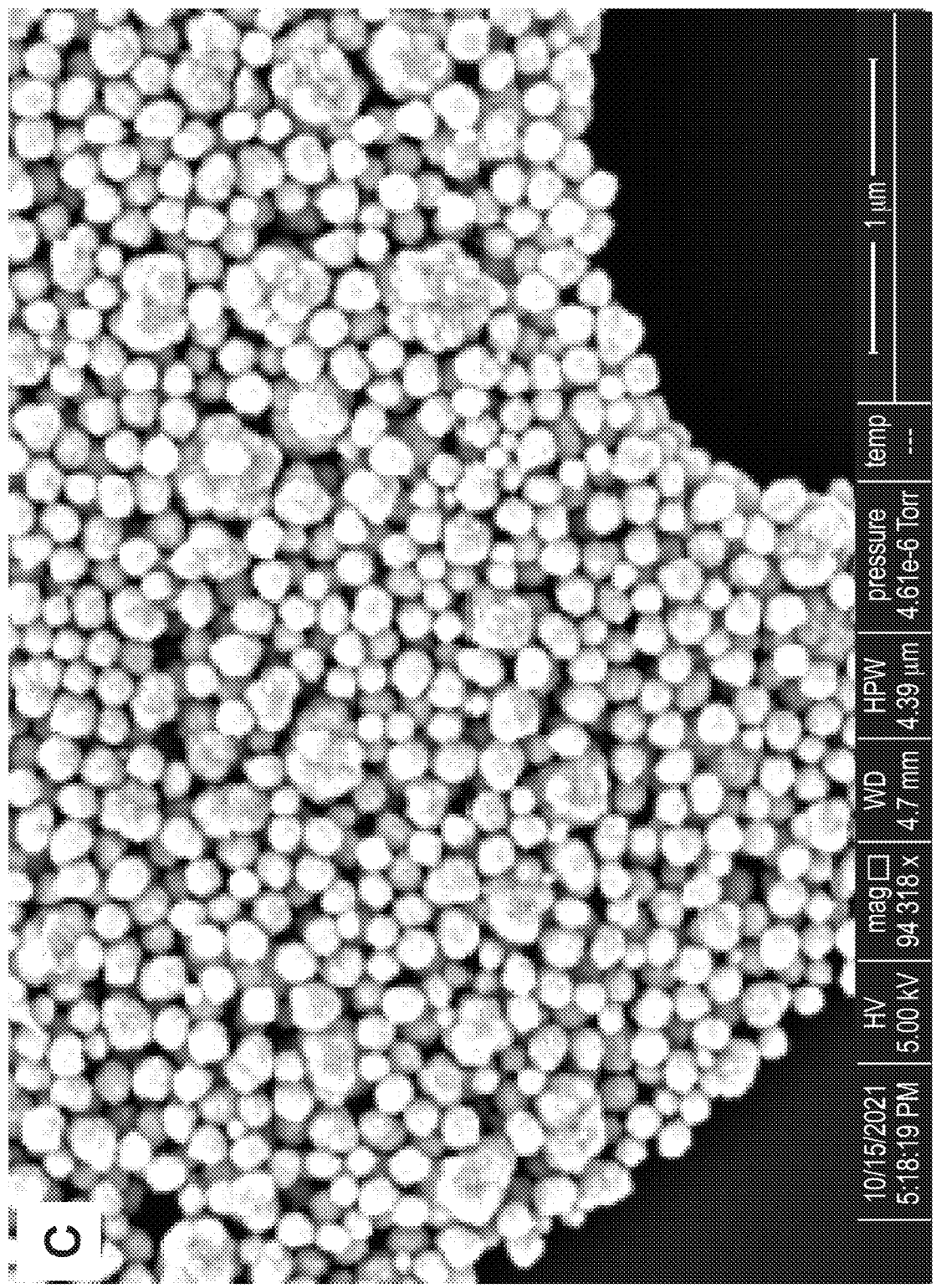
FIG. 12A shows an SEM image as described in Example VI.
Figure 12B:
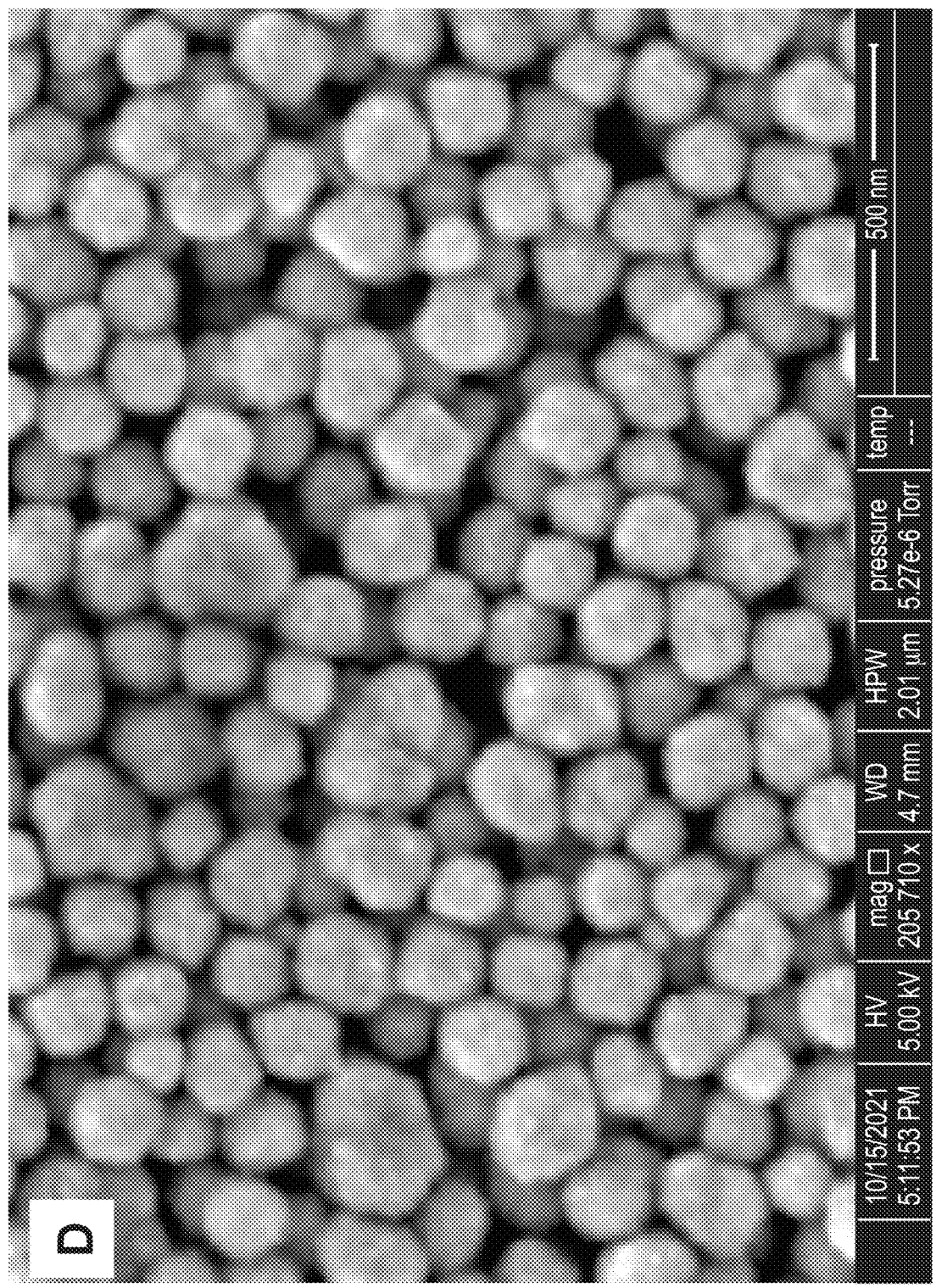
FIG. 12B shows an SEM image as described in Example VI.
Figure 13:
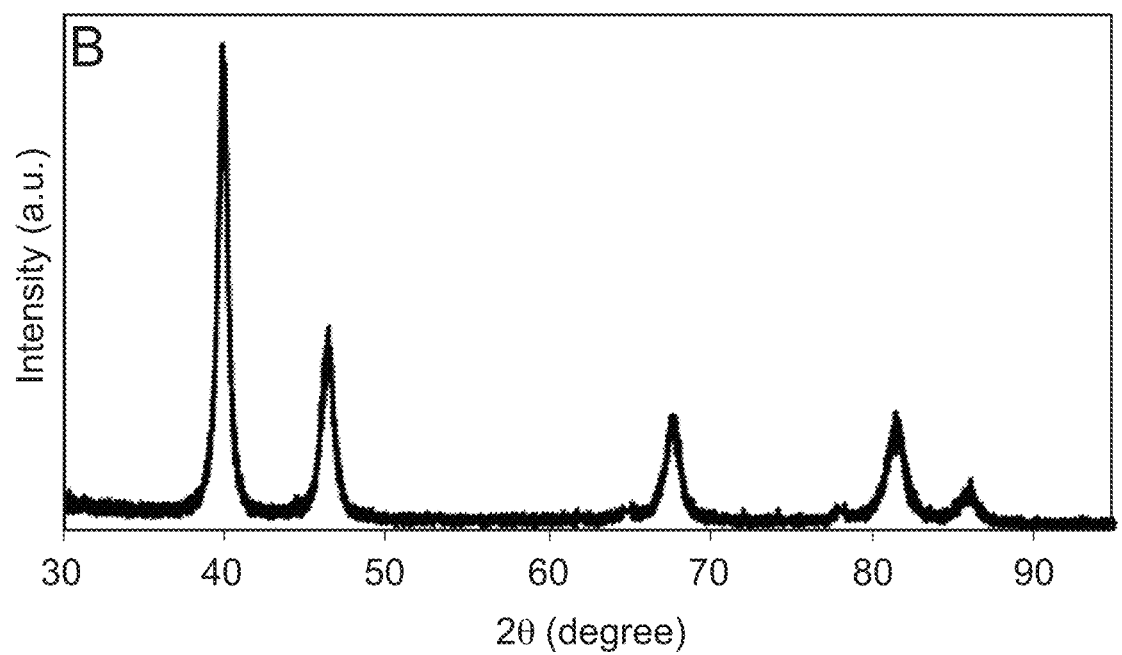
FIG. 13 shows an XRD pattern as described in Example VI.

FIGS. 12A and 12B show SEM images of the resulting Pt branched nanostructures. FIG. 13 shows the XRD pattern corresponding with the resulting Pt branched nanostructures. There were {111}, {200}, {220}, {311}, and {222} diffraction peaks observed in the XRD pattern, which was consistent with the Pt branched nanoparticles synthesized using HDA as described in Example I.

Example VII: Synthesis of Platinum Branched Nanoparticles Using Platinum Acetylacetonate First, to prepare a Pt-OLA precursor stock solution, 51.7 mg of platinum acetylacetonate (0.1 mmol) and 2.0 mL OLA (70%) were heated and shaken for 5 minutes. Then, the stock solution was diluted to a Pt-OLA concentration of 26 mg/mL.

Then, a second metal precursor solution was prepared by loading 5.0 g of HDA (90%) and 51.7 mg of chloroplatinic acid hexahydrate into a 50 mL three-neck flask, where oxygen was removed through argon blowing for 20 minutes. The second metal precursor solution was heated to 200° C., at which point it turned light gray.

Then, 3.0 mL of the Pt-OLA precursor stock solution was injected into the flask under argon flow to provide a reaction solution.

After 20 minutes at 200° C., the reaction solution was cooled to 80° C., and a solvent of 5 mL of hexane and 5 mL of ethanol was injected. The products were separated by centrifuging at 3000 rpm for 2 minutes. The supernatant was discarded, and 10 mL of hexane was then added to the sediment. The mixture was centrifuged at 4000 rpm for 5 minutes. The washing procedure was repeated twice to remove unreacted precursors and surfactant. The platinum branched nanoparticles were stored in hydrophobic solvents before characterization.

Figure 14:
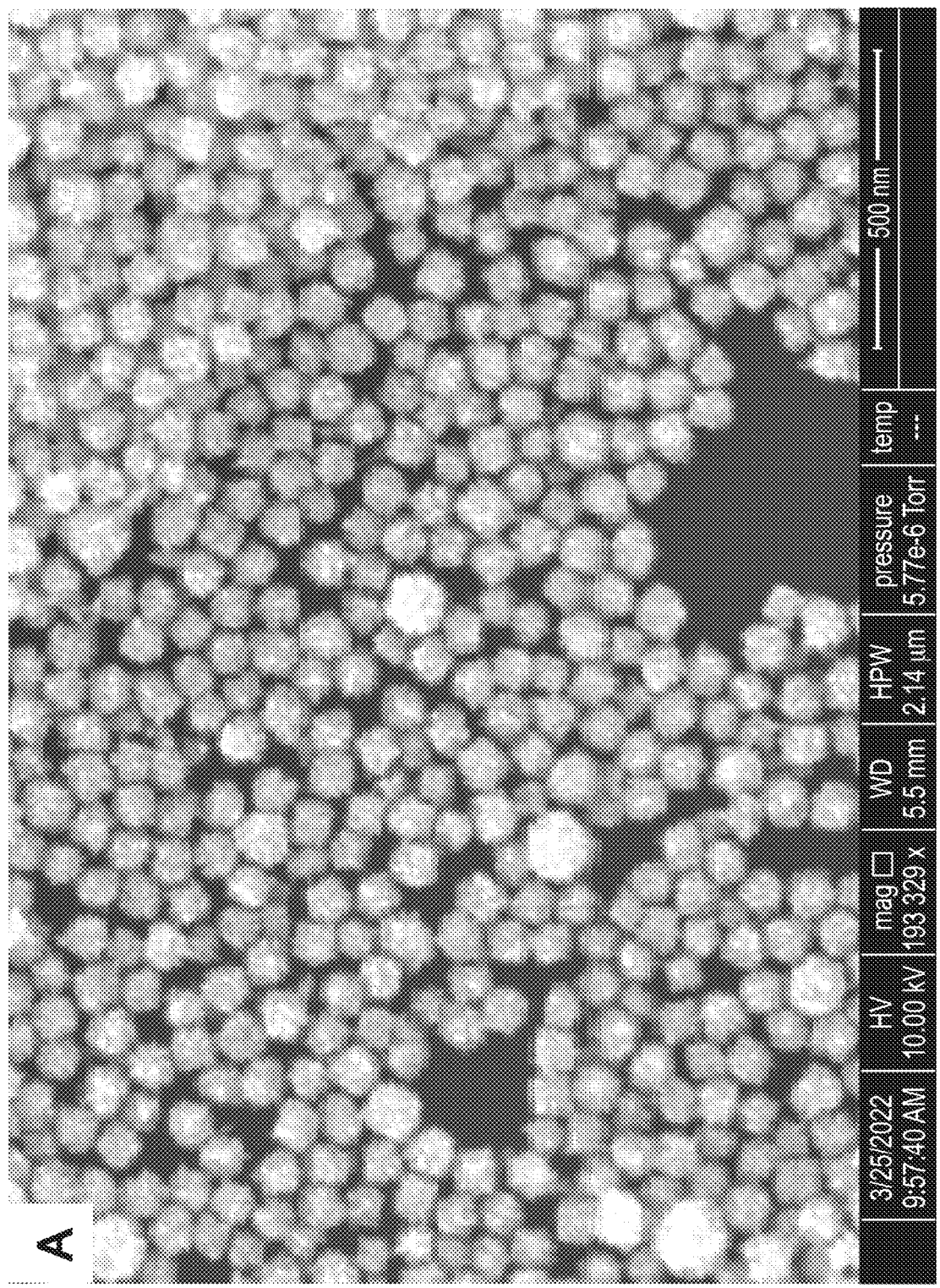
FIG. 14 shows an SEM image as described in Example VII.

FIG. 14 shows an SEM images of the resulting Pt branched nanostructures.

Example VIII: Synthesis of Platinum Branched Nanoparticles Using Platinum Chloride First, to prepare a Pt-OLA precursor stock solution, 51.7 mg of platinum chloride (0.1 mmol) and 2.0 mL OLA (70%) were heated and shaken for 5 minutes. Then, the stock solution was diluted to a Pt-OLA concentration of 26 mg/mL.

Then, a second metal precursor solution was prepared by loading 5.0 g of HDA (90%) and 51.7 mg of chloroplatinic acid hexahydrate into a 50 mL three-neck flask, where oxygen was removed through argon blowing for 20 minutes. The second metal precursor solution was heated to 200° C., at which point it turned light gray.

Then, 3.0 mL of the Pt-OLA precursor stock solution was injected into the flask under argon flow to provide a reaction solution.

After 20 minutes at 200° C., the reaction solution was cooled to 80° C., and a solvent of 5 mL of hexane and 5 mL of ethanol was injected. The products were separated by centrifuging at 3000 rpm for 2 minutes. The supernatant was discarded, and 10 mL of hexane was then added to the sediment. The mixture was centrifuged at 4000 rpm for 5 minutes. The washing procedure was repeated twice to remove unreacted precursors and surfactant. The platinum branched nanoparticles were stored in hydrophobic solvents before characterization.

Figure 15:
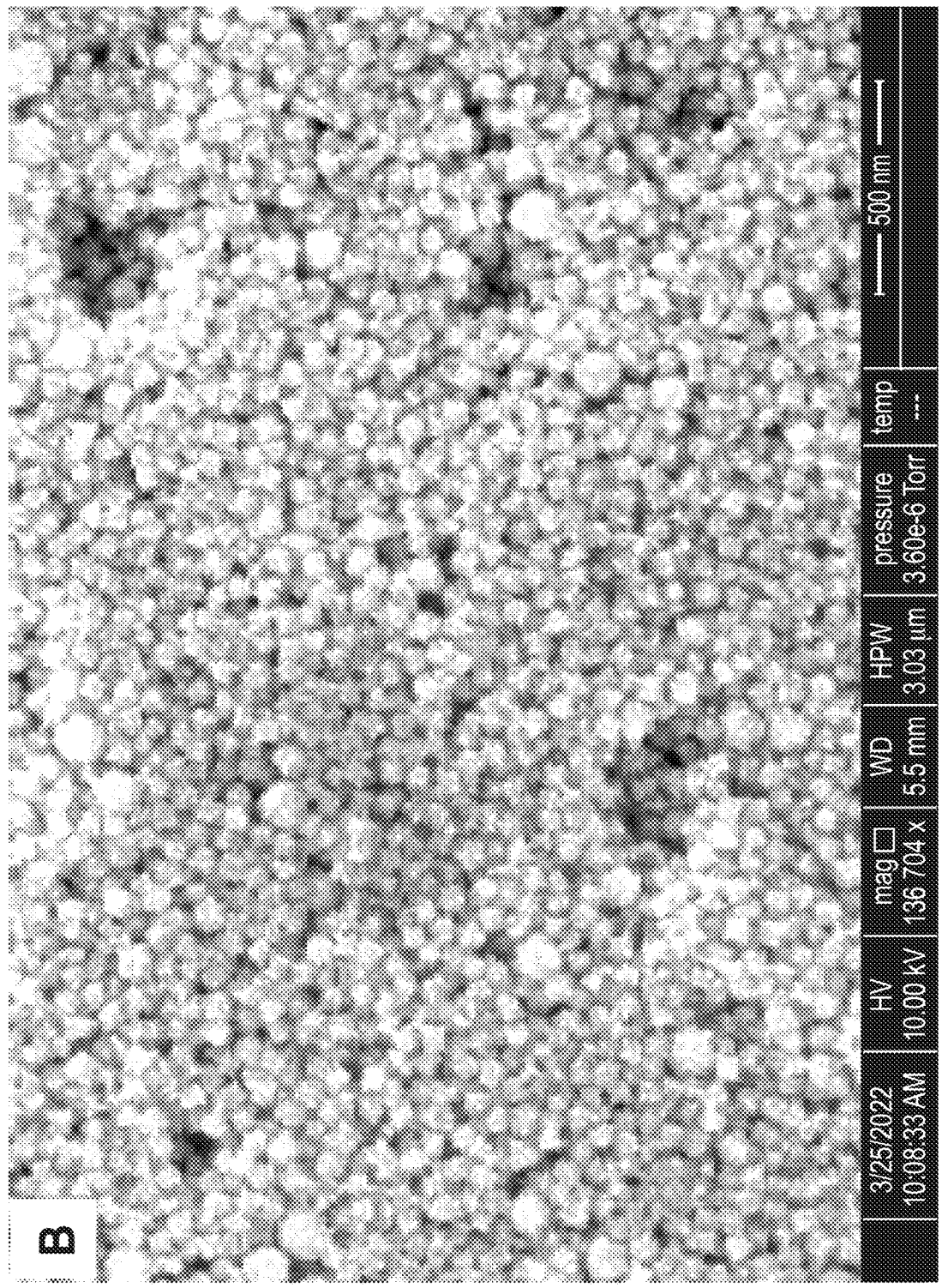
FIG. 15 shows an SEM image as described in Example VIII.

FIG. 15 shows an SEM images of the resulting Pt branched nanostructures.

What is claimed is:

1. A method for making a branched metal nanocatalyst, comprising:
    providing a first metal precursor solution comprising a first metal precursor, wherein providing the first metal precursor solution comprises combining a first metal ion source and a first alkylamine, and
    providing a second metal precursor solution, wherein providing the second metal precursor solution comprises combining a second metal ion source and a second alkylamine,
    heating the second metal precursor solution;
    combining the first metal precursor solution with the second metal precursor solution to provide a reaction solution; and
    holding the reaction solution at an elevated temperature for a reaction time to provide a branched metal nanocatalyst.

2. The method of claim 1, wherein the first metal ion source is selected from a group consisting of sodium hexachloroplatinate hexahydrate, chloroplatinic acid hexahydrate, platinum chloride, platinum acetylacetonate, hydrates thereof, and combinations thereof.

3. The method according to claim 1, wherein the first alkylamine is selected from a group consisting of oleylamine, hexadectylamine, dodecylamine, octadecylamine, tetradecylamine, and combinations thereof.

4. The method of claim 1, wherein the first metal precursor is selected from a group consisting of Pt-OLA, Pt-HDA, Pt-DD, Pt-ODA, and Pt-TDA.

5. The method of claim 1, wherein the second metal ion source is selected from a group consisting of sodium hexachloroplatinate hexahydrate, chloroplatinic acid hexahydrate, platinum chloride, platinum acetylacetonate, hydrates thereof, and combinations thereof.

6. The method according to claim 1, wherein the second alkylamine is selected from a group consisting of oleylamine, hexadectylamine, dodecylamine, octadecylamine, tetradecylamine, and combinations thereof.

7. The method of claim 1, wherein the elevated temperature is between about 100 and 300° C.

8. The method of claim 1, wherein the elevated temperature is between about 100 and 200° C.

9. The method of claim 1, wherein the branched metal nanocatalyst comprises platinum.

10. The method of claim 9, wherein branched metal nanocatalyst is enclosed by high-index facets.

11. The method according to claim 9, wherein the branched metal nanocatalyst has a mass activity of at least 0.44 A/$mg_{Pt}$ at 0.9 V with <40% loss in initial activity after 100,000 cycles in a proton exchange membrane fuel cell.

12. The method of claim 1, wherein a concentration of the first metal precursor provided to the reaction solution is between about 1 and 200 mg/mL.

13. The method of claim 1, wherein an atomic molar ratio of the first metal ion source to the first alkylamine combined to provide the first metal precursor solution is from about 1:1 to 1:200.

14. The method of claim 13, wherein the atomic molar ratio of the first metal ion source to the first alkylamine combined to provide the first metal precursor solution is from about 1:10 to 1:160.

15. The method of claim 1, wherein an atomic molar ratio of the second metal ion source to the second alkylamine combined to provide the first metal precursor solution is from about 1:1 to 1:500.

16. The method of claim 15, wherein the atomic molar ratio of the second metal ion source to the second alkylamine combined to provide the first metal precursor solution is from about 1:10 to 1:360.

17. A branched metal nanocatalyst prepared by the method according to claim 1, wherein the branched metal nanocatalyst comprises platinum, and wherein branched metal nanocatalyst is enclosed by high-index facets.

* * * * *